TODO (12) United States Patent
Furuta et al.

(10) Patent No.: US 12,529,884 B2
(45) Date of Patent: Jan. 20, 2026

(54) ACCOMMODATION CASE FOR ELECTRONIC DEVICE

(71) Applicant: FUJIFILM Corporation, Tokyo (JP)

(72) Inventors: Ayana Furuta, Kanagawa (JP); Yutaka Senda, Kanagawa (JP); Masato Saito, Kanagawa (JP); Yuki Harasawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 56 days.

(21) Appl. No.: 18/179,298

(22) Filed: Mar. 6, 2023

(65) Prior Publication Data

US 2023/0314789 A1 Oct. 5, 2023

(30) Foreign Application Priority Data

Mar. 30, 2022 (JP) ................................ 2022-056630

(51) Int. Cl.
*G02B 23/24* (2006.01)
*H04N 23/50* (2023.01)

(52) U.S. Cl.
CPC ..... *G02B 23/2484* (2013.01); *G02B 23/2476* (2013.01); *H04N 23/555* (2023.01)

(58) Field of Classification Search
CPC ... A61B 1/00; A61B 1/00002; A61B 1/00018; A61B 1/00048; G02B 23/2484; G02B 23/2476; H04N 23/55
USPC .................................................... 348/65, 373
See application file for complete search history.

(56) References Cited

U.S. PATENT DOCUMENTS

| | | | |
|---|---|---|---|
| 6,352,322 B1 | 3/2002 | Nakao | |
| 9,267,638 B2* | 2/2016 | Le Gette | .............. H04R 1/1033 |
| 9,374,918 B2* | 6/2016 | Krohn | ..................... G06F 1/166 |
| 11,181,227 B1* | 11/2021 | Pontecorvo | ............ F16M 11/26 |
| 2005/0085690 A1* | 4/2005 | Tien | .................. A61B 1/00105 |
| | | | 348/E7.087 |
| 2008/0207993 A1 | 8/2008 | Maruyama et al. | |
| 2009/0152432 A1 | 6/2009 | Kunii et al. | |
| 2012/0039021 A1* | 2/2012 | Karwan | ................ G06F 3/0219 |
| | | | 361/679.01 |

(Continued)

FOREIGN PATENT DOCUMENTS

CN 203709459 U 7/2014
CN 215258703 U 12/2021

(Continued)

OTHER PUBLICATIONS

"Notice of Reasons for Refusal" Office Action issued in JP 2022-056630; mailed by the Japanese Patent Office on Sep. 16, 2025.

*Primary Examiner* — John W Miller
*Assistant Examiner* — Omer Khalid
(74) *Attorney, Agent, or Firm* — Studebaker Brackett PLLC

(57) ABSTRACT

An accommodation case for an electronic device, includes: a case main body capable of accommodating an electronic device including a display; and an opening and closing member supported on the case main body so as to be openable and closable, and an article accommodation portion that is capable of accommodating at least a part of an article and that has an opening is formed between the opening and closing member and an outer surface of the case main body in a state in which the opening and closing member is closed.

20 Claims, 20 Drawing Sheets

(56) References Cited

U.S. PATENT DOCUMENTS

| | | |
|---|---|---|
| 2012/0181196 A1* | 7/2012 | Mongan ............... H04B 1/3877 |
| | | 206/320 |
| 2014/0085777 A1* | 3/2014 | Yeh ......................... G06F 1/181 |
| | | 361/679.01 |
| 2015/0111621 A1 | 4/2015 | Smith |
| 2017/0230072 A1* | 8/2017 | Kim ..................... F16M 11/041 |
| 2019/0258300 A1 | 8/2019 | Gerardi |
| 2021/0259516 A1 | 8/2021 | Ubbesen et al. |
| 2021/0259518 A1* | 8/2021 | Ubbesen ............ A61B 1/00018 |
| 2023/0140707 A1* | 5/2023 | Henning ............... G06F 1/1632 |
| | | 361/679.01 |

FOREIGN PATENT DOCUMENTS

| | | |
|---|---|---|
| JP | 2008-216387 A | 9/2008 |
| JP | 2009-147037 A | 7/2009 |
| JP | 2018-189884 A | 11/2018 |
| JP | 2019-533874 A | 11/2019 |
| WO | 99/10860 A1 | 3/1999 |

\* cited by examiner

ACCOMMODATION CASE FOR ELECTRONIC DEVICE

CROSS-REFERENCE TO RELATED APPLICATIONS

The present application claims priority under 35 U.S.C. § 119 to Japanese Patent Application No. 2022-056630, filed on Mar. 30, 2022. The above application is hereby expressly incorporated by reference, in its entirety, into the present application.

BACKGROUND OF THE INVENTION

1. Field of the Invention

The present invention relates to an accommodation case for an electronic device.

2. Description of the Related Art

US2021/259518A discloses a portable medical monitor having a handle that functions as a table stand.

SUMMARY OF THE INVENTION

An object of the present invention is to provide an accommodation case for an electronic device having a novel structure.

According to an embodiment of the technology of the present disclosure, there is provided an accommodation case for an electronic device, comprising: a case main body capable of accommodating an electronic device including a display; and an opening and closing member supported on the case main body so as to be openable and closable, in which an article accommodation portion that is capable of accommodating at least a part of an article and that has an opening is formed between the opening and closing member and an outer surface of the case main body in a state in which the opening and closing member is closed.

According to the present invention, it is possible to provide an accommodation case for an electronic device having a novel structure.

DESCRIPTION OF THE PREFERRED EMBODIMENTS

Figure 1:
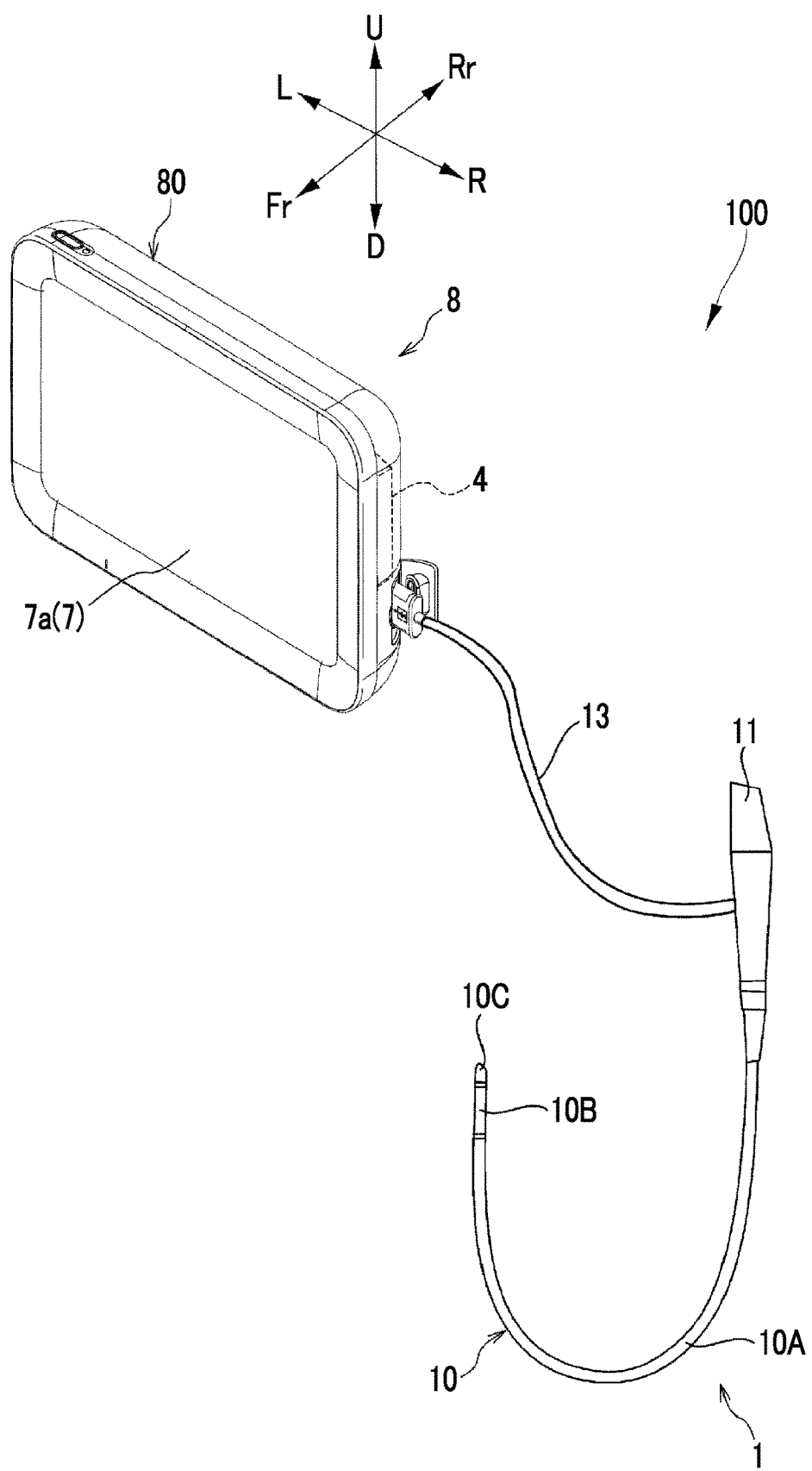
FIG. 1 is a schematic diagram showing an endoscope system 100.

Hereinafter, an endoscope system 100 comprising an accommodation case 8, which is an embodiment of an accommodation case for an electronic device, and an adapter device 50, which is an embodiment of an adapter device, will be described with reference to FIGS. 1 to 20.

Hereinafter, in the accommodation case 8 having a substantially rectangular shape, three orthogonal directions will be referred to as a left-right direction, an up-down direction, and a front-rear direction in descending order of length. Specifically, in a state in which the accommodation case 8 accommodating a portable information terminal 7 as the electronic device is disposed such that a transverse direction of a display 7a of the portable information terminal 7 is parallel to a vertical direction, an upper side (upper direction) of the accommodation case 8 in the vertical direction will be denoted by "U", a lower side (lower direction) will be denoted by "D", a right side (right direction) while facing the display 7a will be denoted by "R", a left side (left direction) will be denoted by "L", a rear side (rear direction) as viewed from a display 7a side will be denoted by "Rr", and a front side (front direction" will be denoted by "Fr". In addition, in the adapter device 50, the same directions as those in the accommodation case 8 will be denoted in a state in which the accommodation case 8 is mounted. A rear surface of the accommodation case 8 may also be denoted by a back surface.

Configuration of Endoscope System 100

FIG. 1 is a schematic diagram showing the endoscope system 100. The endoscope system 100 comprises an endoscope 1, the accommodation case 8 that accommodates the portable information terminal 7 and an interface adapter 4, and a communication cable 13. In FIG. 1, the interface adapter 4 is entirely accommodated inside the accommodation case 8 and is not visible from an outside.

The endoscope 1 includes an endoscope insertion part 10 which is a tubular member extending in one direction and which is inserted into a subject and an endoscope operation part 11 which is provided in a proximal end part of the endoscope insertion part 10 and which is used to perform various types of operations for the endoscope 1. The endoscope operation part 11 includes, for example, an angle knob for bending the endoscope insertion part 10 through a rotational movement operation. The endoscope operation part 11 may include, for example, an operation member for performing an observation mode switching operation, an image pickup recording operation, a forceps operation, an air supply and water supply operation, a suction operation, and the like of the endoscope 1.

The endoscope 1 is connected to the interface adapter 4 via the communication cable 13. The endoscope 1 can be attached to and detached from the interface adapter 4 via the communication cable 13 and can be used once (that is, disposable). The communication cable 13 may be attachable to and detachable from the interface adapter 4, or the endoscope 1 may be attachable to and detachable from the communication cable 13.

Various channels, such as a forceps hole for inserting a forceps for collecting a biological tissue, such as a cell or a polyp, a channel for air supply and water supply, and a channel for suction, may be provided inside the endoscope operation part 11 and the endoscope insertion part 10.

The endoscope insertion part 10 is composed of a flexible soft portion 10A, a bendable portion 10B provided at a distal end of the soft portion 10A, and a rigid distal end portion 10C provided at a distal end of the bendable portion 10B. The bendable portion 10B is bendable through an operation of the endoscope operation part 11 (for example, the angle knob). The bendable portion 10B can be bent in any direction at any angle depending on a part of the subject or the like for which the endoscope 1 is used, and the distal end portion 10C can be directed in a desired direction.

The interface adapter 4 connects the endoscope 1 and the portable information terminal 7 to each other. In the example of FIG. 1, the interface adapter 4 is communicably connected to the endoscope 1 via the communication cable 13. The interface adapter 4 is communicably connected to the portable information terminal 7 by wire or wirelessly. The interface adapter 4 receives, from the endoscope 1, an image pickup signal obtained by picking up an image of an inside of the subject with an image pickup sensor of the endoscope 1, and converts the received image pickup signal into image data capable of being displayed by the portable information terminal 7. Then, the interface adapter 4 transmits the converted image data to the portable information terminal 7.

The portable information terminal 7 is, for example, a general-purpose portable information terminal, such as a tablet terminal or a smartphone, and is an example of the electronic device. The portable information terminal 7 has the display 7a capable of displaying an image based on the image data. The portable information terminal 7 receives, from the interface adapter 4, for example, a picked-up image obtained by picking up the image of the inside of the subject with the endoscope 1 and displays the received picked-up image on the display 7a. The display 7a has a display surface in which display pixels are two-dimensionally arranged, and pixel data constituting the image data is drawn on each display pixel of the display surface so that the image based on the image data is displayed. In addition, the portable information terminal 7 also serves as a user interface for controlling the interface adapter 4.

Configuration of Accommodation Case 8

Figure 2:
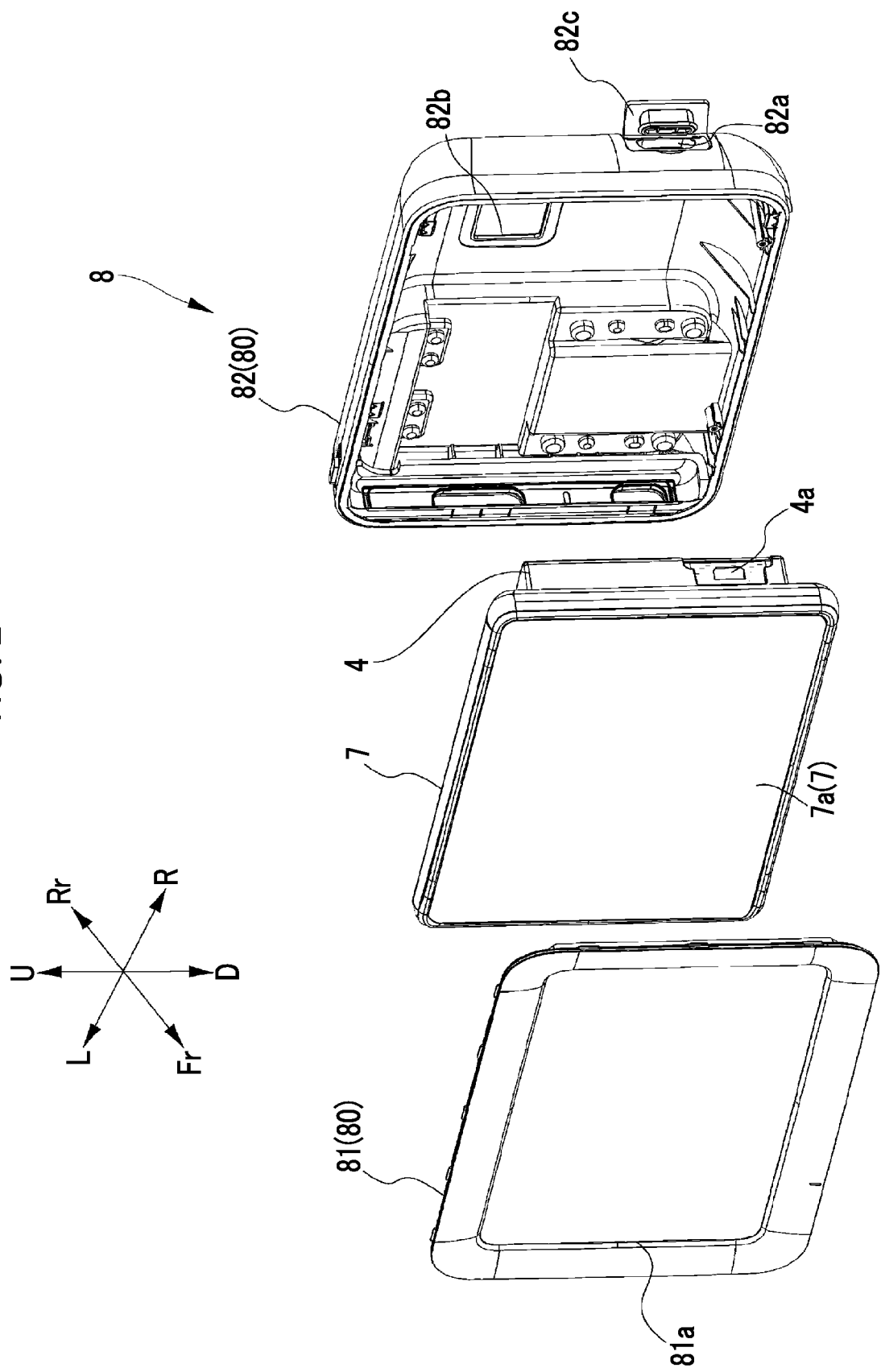
FIG. 2 is a perspective view of a state before an interface adapter 4 and a portable information terminal 7 are accommodated in an accommodation case 8 as viewed obliquely from behind.
Figure 3:
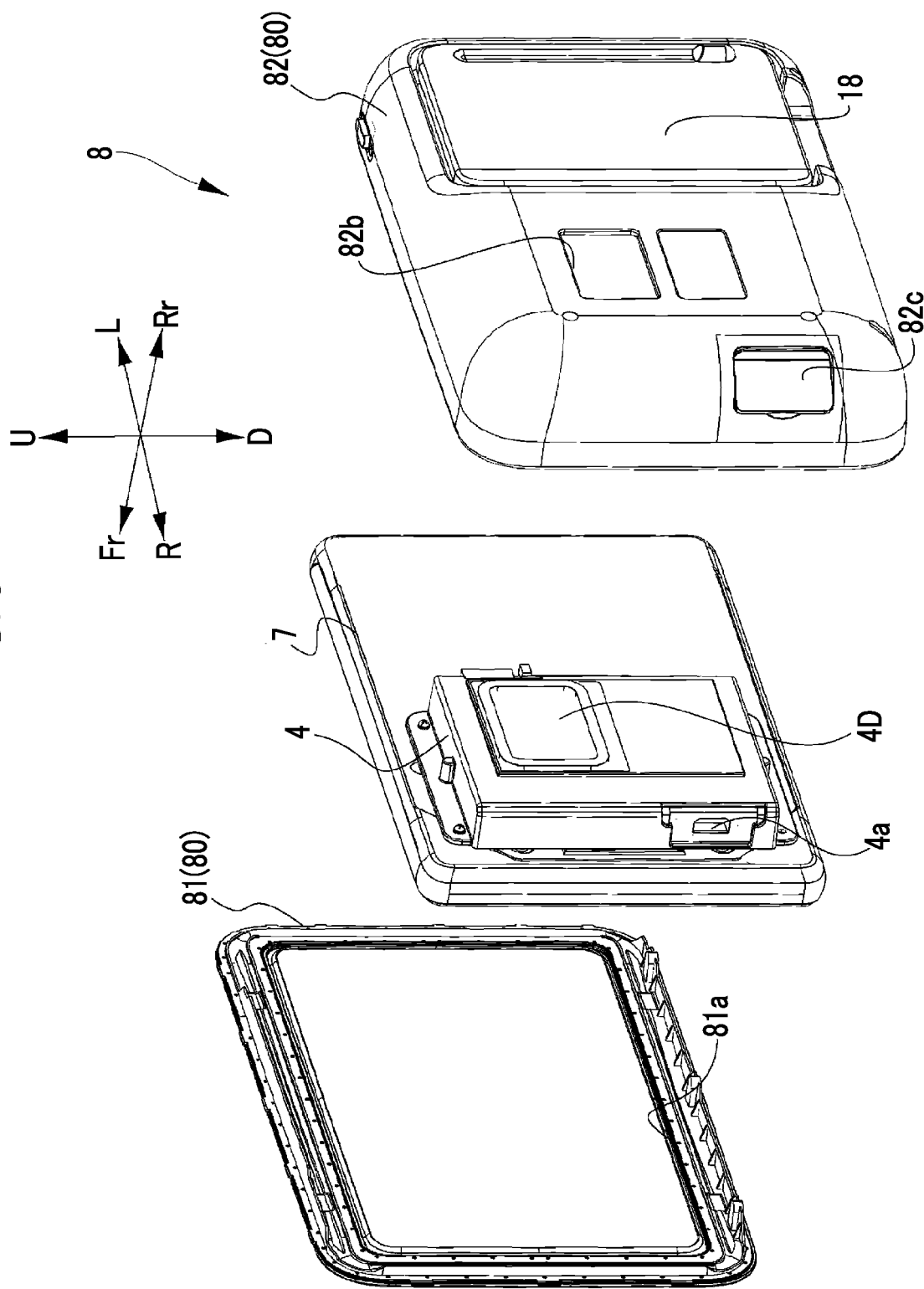
FIG. 3 is a perspective view of a state before the interface adapter 4 and the portable information terminal 7 are accommodated in the accommodation case 8 as viewed obliquely from ahead.
Figure 4:
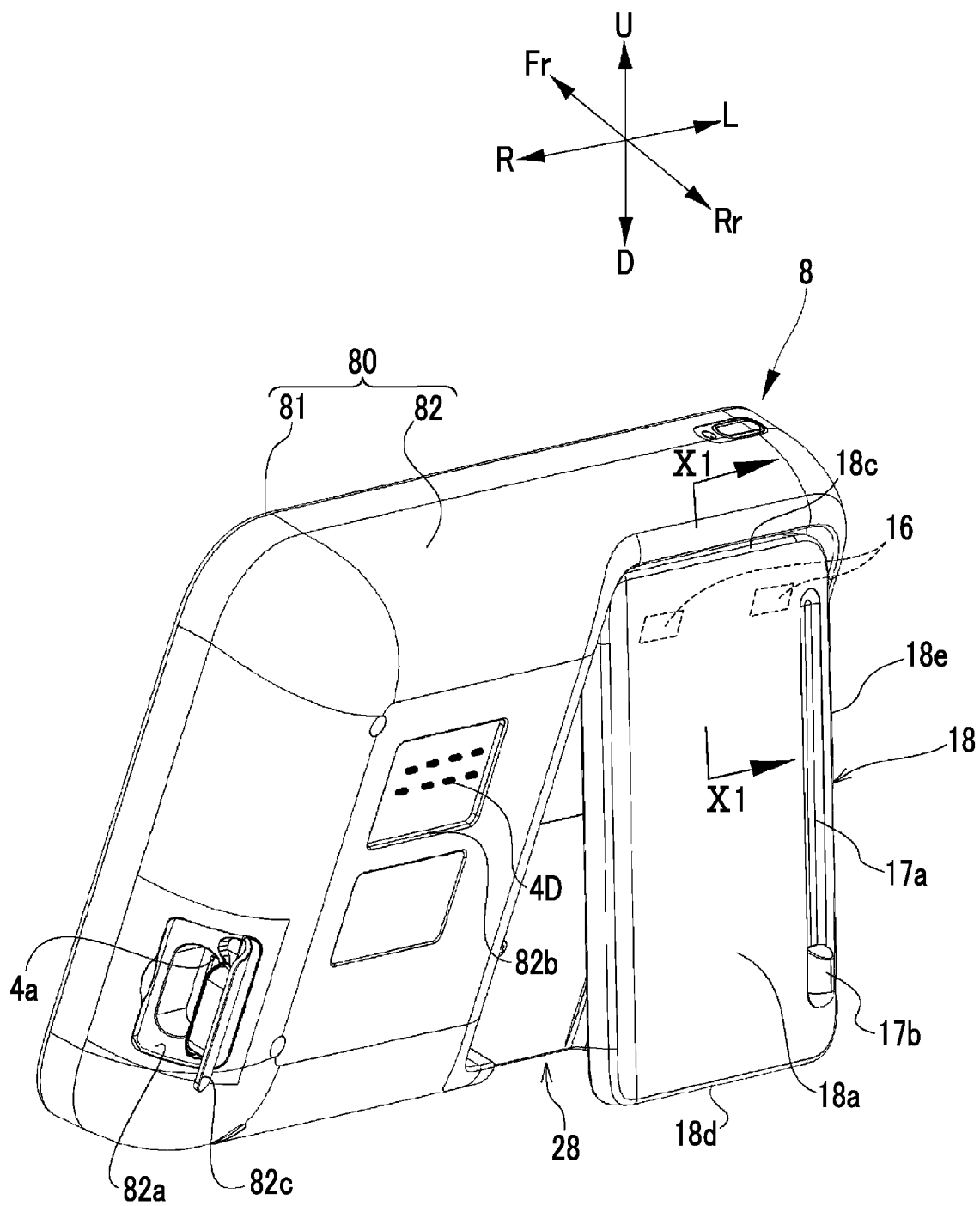
FIG. 4 is a perspective view of the accommodation case 8 in a state in which an opening and closing member 18 is opened and in a state in which the portable information terminal 7 and the interface adapter 4 are accommodated, as viewed obliquely from behind.
Figure 5:
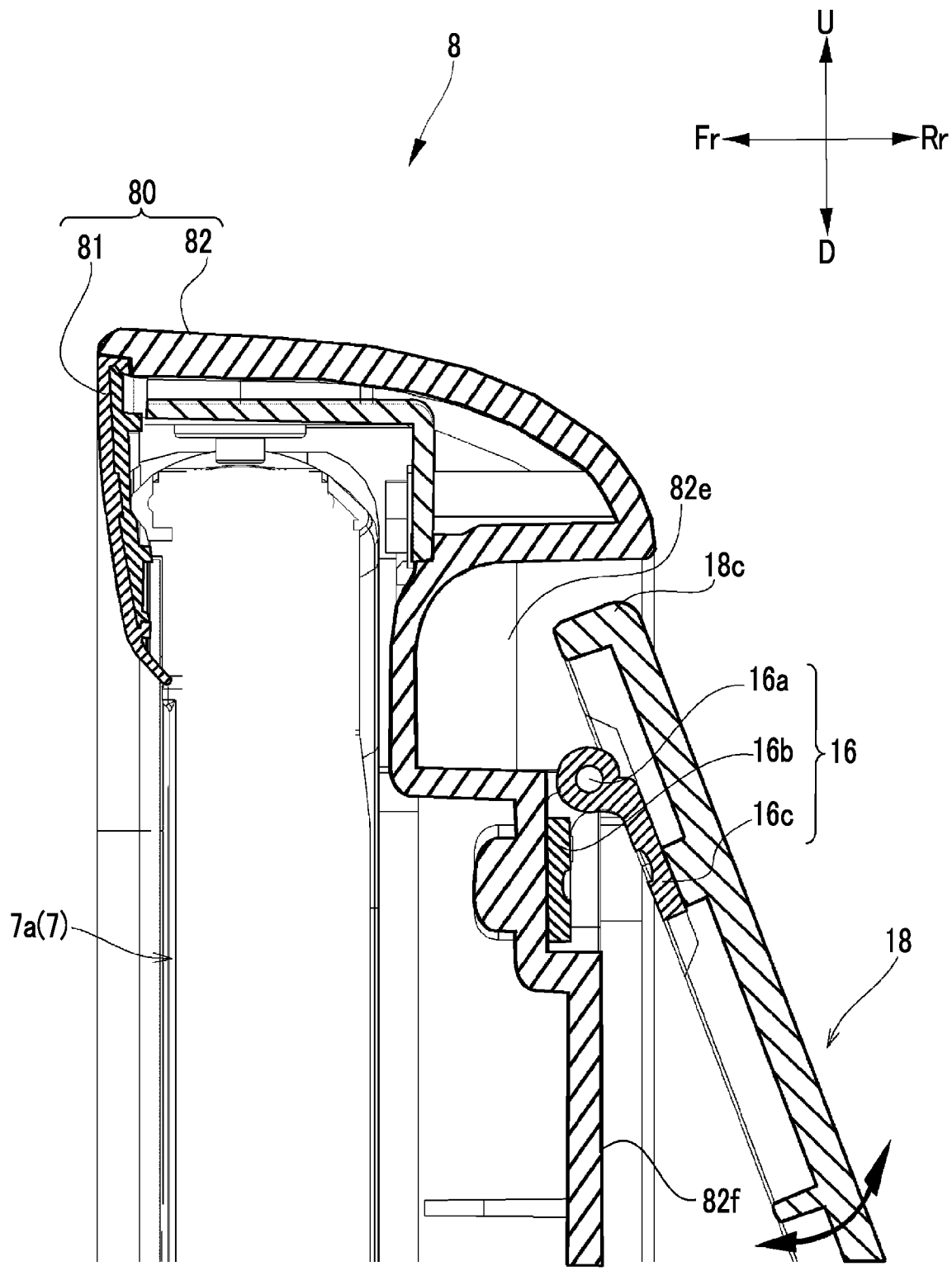
FIG. 5 is an enlarged cross-sectional view taken along line X1-X1 of FIG. 4.
Figure 6:
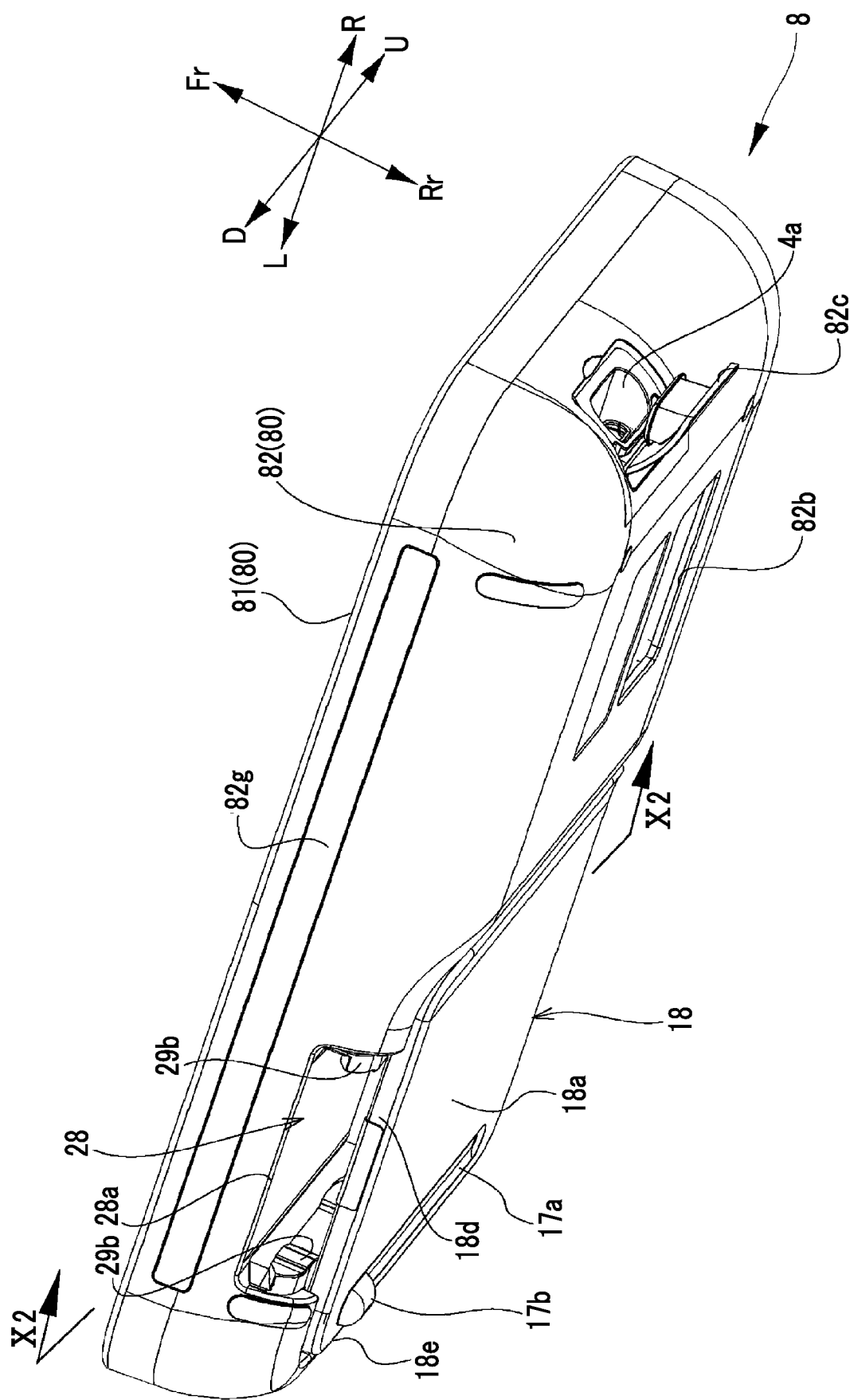
FIG. 6 is a perspective view of the accommodation case 8 in a state in which the opening and closing member 18 is closed and in a state in which the portable information terminal 7 and the interface adapter 4 are accommodated, as viewed obliquely from below.
Figure 7:
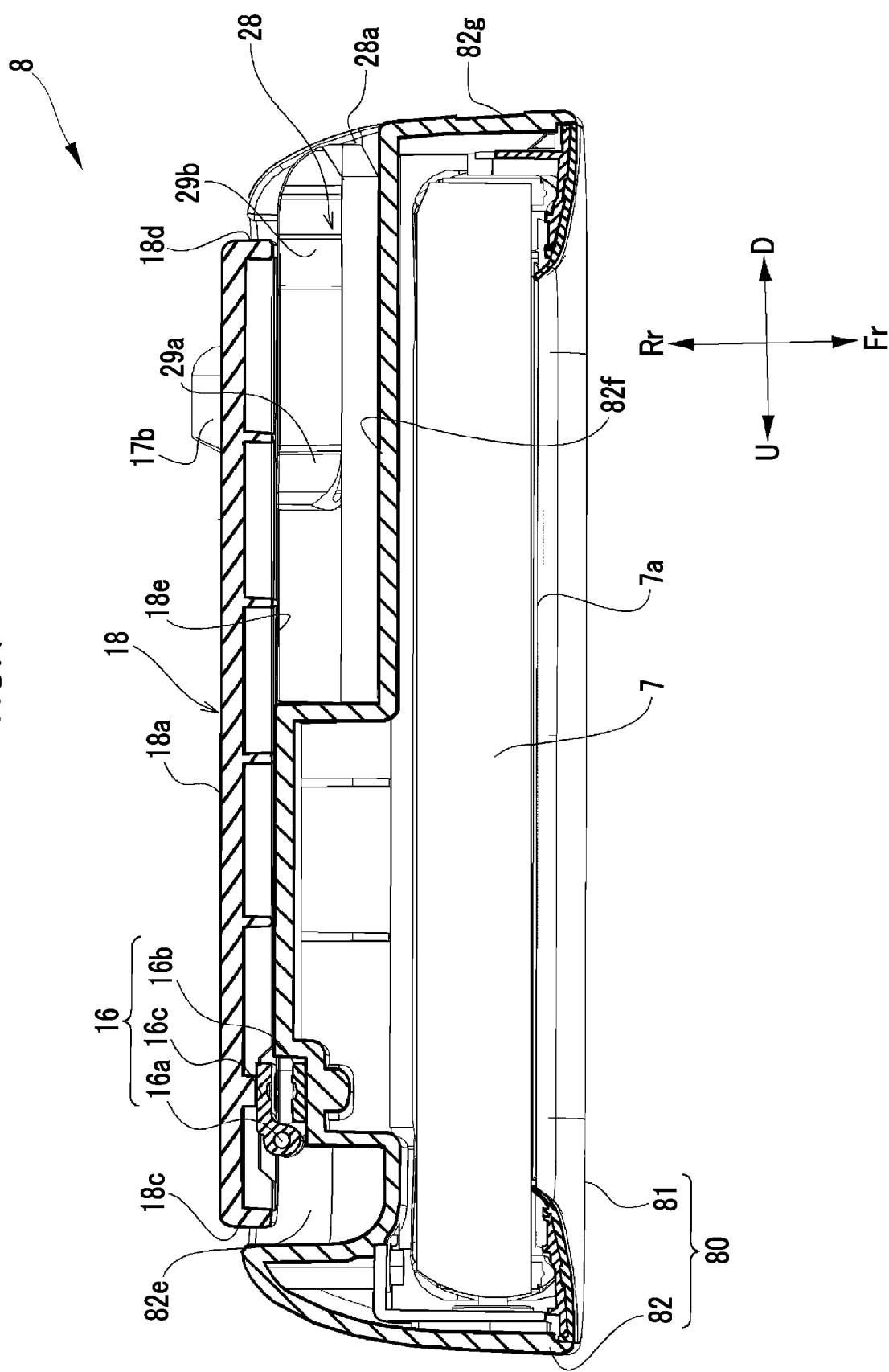
FIG. 7 is a cross-sectional view taken along line X2-X2 of FIG. 6.
Figure 8:
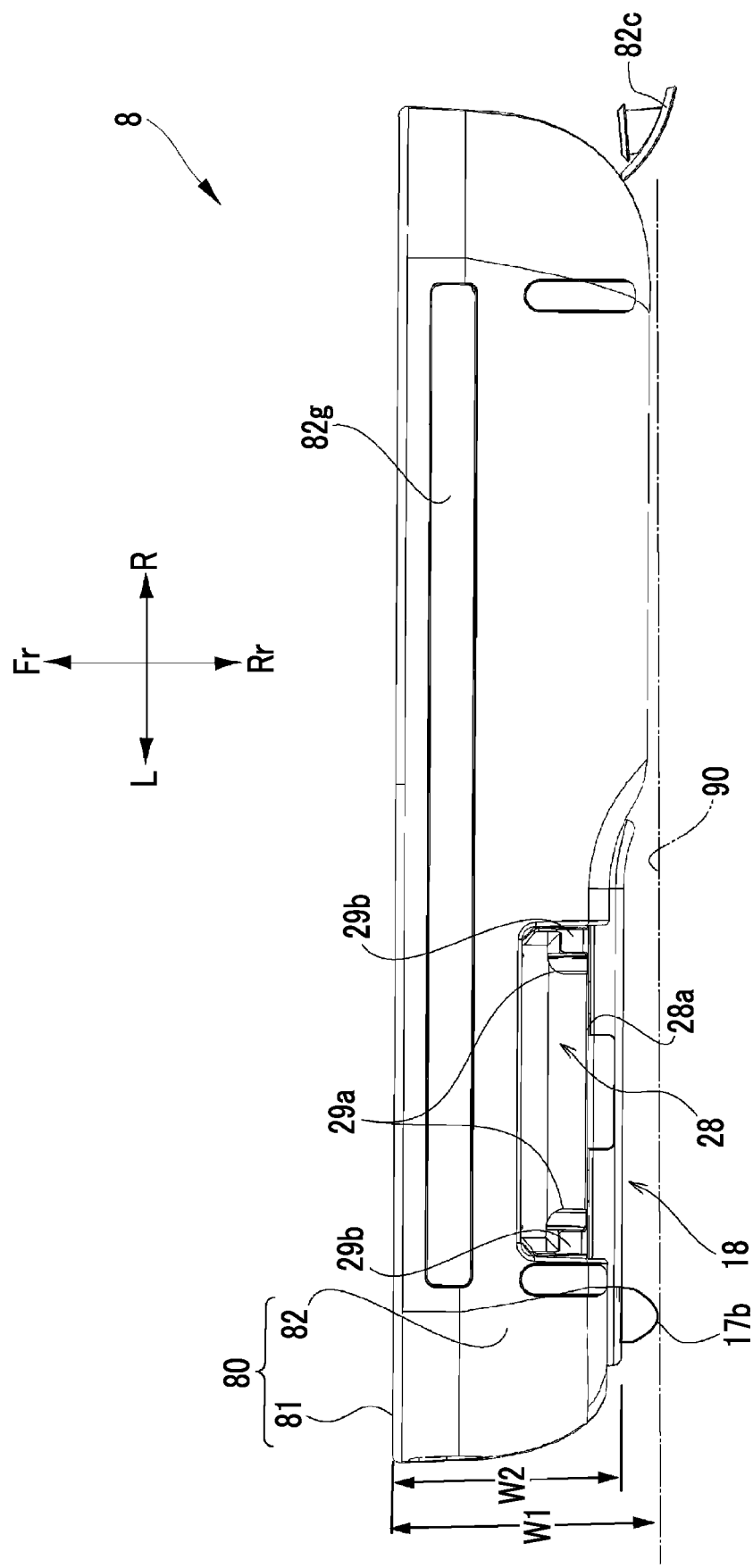
FIG. 8 is a bottom view of the accommodation case 8 shown in FIG. 6 as viewed from a lower side.

FIGS. 2 and 3 are perspective views showing a state before the interface adapter 4 and the portable information terminal 7 are accommodated in the accommodation case 8. FIGS. 2 and 3 are views of the interface adapter 4, the portable information terminal 7, and the accommodation case 8 as viewed from different directions. FIG. 4 is a perspective view of the accommodation case 8 in a state in which an opening and closing member 18 is opened and in a state in which the portable information terminal 7 and the interface adapter 4 are accommodated, as viewed obliquely from behind. FIG. 5 is an enlarged cross-sectional view taken along line X1-X1 of FIG. 4. FIG. 6 is a perspective view of the accommodation case 8 in a state in which the opening and closing member 18 is closed and in a state in which the portable information terminal 7 and the interface adapter 4 are accommodated, as viewed obliquely from below. FIG. 7 is a cross-sectional view taken along line X2-X2 of FIG. 6. FIG. 8 is a bottom view of the accommodation case 8 shown in FIG. 6 as viewed from the lower side.

As shown in FIGS. 2 and 3, the accommodation case 8 comprises a case main body portion 80 as an exterior housing including a frame-shaped front cover 81 and a rear case 82, and the opening and closing member 18 supported on a rear side of an outer surface of the case main body portion 80 so as to be openable and closable.

The front cover 81 is a member that protects a front surface of the portable information terminal 7. The front cover 81 has an opening portion 81a for exposing the display 7a from the front cover 81 so that display on the display 7a of the portable information terminal 7 or a touch operation on the display 7a can be performed. The front cover 81 may include a thin film that covers the opening portion 81a.

The rear case 82 is a member that protects a rear surface of the portable information terminal 7. As shown in FIG. 4, the rear case 82 is provided with a cable insertion hole 82a such that the communication cable 13 is connectable to a video input terminal 4a of the interface adapter 4 accommodated in the accommodation case 8 from the outside of the accommodation case 8. The rear case 82 is provided with a cable insertion hole lid 82c that closes the cable insertion hole 82a. The rear case 82 is provided with a window portion 82b such that a nameplate 4D on which information such as reference conformity, which is added to a housing of the interface adapter 4 by means such as printing or affixing, is written is visually recognizable from the outside of the accommodation case 8.

As shown in FIGS. 2 and 3, the interface adapter 4 is accommodated in the accommodation case 8 together with the portable information terminal 7, whereby the interface adapter 4 is fixed to the accommodation case 8. The interface adapter 4 is fixed to the accommodation case 8 via the portable information terminal 7 by being attached to the rear surface of the portable information terminal 7 fixed by the accommodation case 8. The interface adapter 4 is provided at a position eccentric to the right side in the left-right direction of the case main body portion 80. The interface adapter 4 has a certain size in width (thickness) in the front-rear direction.

The interface adapter 4 is attached to the portable information terminal 7 by, for example, screwing using a screw hole provided in the rear surface of the portable information terminal 7. The present invention is not limited to the configuration in which the interface adapter 4 is fixed to the accommodation case 8 via the portable information terminal 7, and the interface adapter 4 may be directly attached to the accommodation case 8. For example, the interface adapter 4 may be attached to the rear case 82.

Although not shown, in the state of FIGS. 2 and 3, a video output terminal (not shown) of the interface adapter 4 and the portable information terminal 7 are connected to each other via, for example, a communication cable (for example, a universal serial bus (USB) cable).

As shown in FIG. 4, the cable insertion hole lid 82c is opened in a state in which the portable information terminal 7 and the interface adapter 4 are accommodated in the accommodation case 8, whereby the video input terminal 4a of the interface adapter 4 is exposed from the cable insertion hole 82a of the rear case 82.

The accommodation case 8 has a waterproof structure for preventing water, dust, or the like from entering from the outside. For example, a packing for filling a joint portion between the front cover 81 and the rear case 82 is provided between the front cover 81 and the rear case 82. In addition, an edge portion of the opening portion 81a of the front cover 81 is sealed so as to be in close contact with the display 7a of the portable information terminal 7, and the opening portion 81a is closed by the display 7a. Further, an edge portion of the window portion 82b of the rear case 82 is sealed so as to be in close contact with the housing of the interface adapter 4, and the window portion 82b is closed by the housing of the interface adapter 4. Further, an inner edge portion of the cable insertion hole 82a of the rear case 82 is sealed so as to be in close contact with the housing of the interface adapter 4. The cable insertion hole 82a of the rear case 82 is closed by the housing of the interface adapter 4 in a state in which the cable insertion hole lid 82c is opened. Furthermore, a periphery of the cable insertion hole 82a of the rear case 82 is sealed such that the cable insertion hole 82a is closed by an end part of the communication cable 13 inserted into the cable insertion hole 82a of the rear case 82 in a state in which the cable insertion hole lid 82c is opened.

As described above, the case main body portion 80 has a waterproof structure for preventing water, dust, or the like from entering the inside of the case main body portion 80 by utilizing the interface adapter 4 and the portable information terminal 7 to be accommodated. With this, it is possible to prevent water, dust, or the like from entering the inside of the accommodation case 8 and to protect the interface adapter 4 and the portable information terminal 7, even in a case where the accommodation case 8 is used in an environment such as outdoors.

As shown in FIGS. 4 and 5, the opening and closing member 18 is supported on an outer surface 82f provided on the rear side of the rear case 82 so as to be openable and closable. An opening and closing angle of the opening and closing member 18 is adjustable in a continuously variable manner. With this, the opening and closing member 18 is opened so that the accommodation case 8 can be tilted at a desired angle on a horizontal place, such as a top plate of a table. The opening and closing member 18 is provided at a position eccentric to a side (the left side) opposite to the side (the right side) on which the interface adapter 4 is provided, in the left-right direction of the case main body portion 80. The opening and closing member 18 is supported such that the lower side (a lower end part 18d side constituting a distal end part) is opened and closed. The opening and closing member 18 is supported on the rear case 82 via a pair of hinge portions 16 arranged in the left-right direction.

The hinge portion 16 is provided so as to be rotationally movable around an opening and closing shaft 16a extending in the left-right direction. The hinge portion 16 has a first attachment portion 16b fixed to the rear case 82 and a second attachment portion 16c that is provided so as to be rotationally movable around the opening and closing shaft 16a and that is fixed to the opening and closing member 18.

The rear case 82 has an upper recessed portion 82e provided on the upper side with respect to the hinge portion 16. The upper recessed portion 82e is a space that an upper end part 18c of the opening and closing member 18 enters when the opening and closing member 18 is opened, and enables the opening and closing member 18 to rotationally move. The state in which the opening and closing member 18 is closed means a state in which a lower end part 18d of the opening and closing member 18 is closest to the rear case 82 (a state shown in FIGS. 6 to 8). The state in which the opening and closing member 18 is opened means a state in which the lower end part 18d of the opening and closing member 18 is moved in a direction away from the rear case 82 from the state in which the opening and closing member 18 is closed.

As shown in FIG. 4, a rear surface 18a of the opening and closing member 18 is provided with a recessed portion 17a and a projecting portion 17b. The recessed portion 17a is provided in a left end part 18e of the opening and closing member 18 and extends along the left end part 18e in the up-down direction. The projecting portion 17b is provided at a lower end part of the recessed portion 17a. The sizes of the recessed portion 17a and the projecting portion 17b are not limited to those shown in the drawing. The recessed portion 17a is disposed at a left end of the rear surface of the accommodation case 8. Therefore, in a case where the left end of the accommodation case 8 is gripped by a hand, fingers can be placed on the recessed portion 17a, and the accommodation case 8 can be stably gripped. The recessed portion 17a can also be replaced with a projecting portion, and, even in such a case, it is possible to stably grip the accommodation case 8 by making the projecting portion function as a finger hook portion. In a case where the projecting portion is provided instead of the recessed portion 17a, it is preferable that a height of the projecting portion is the same as a height of the projecting portion 17b.

As shown in FIGS. 6 and 7, a substantially rectangular opening 28a having the lower end part 18d of the opening and closing member 18 as a part of an edge portion of the opening is provided on the lower side and on the rear side of the accommodation case 8. As shown in FIG. 7, in a state in which the opening and closing member 18 is closed, a space having a depth of about half the length of the accommodation case 8 in the up-down direction is formed on the upper side with respect to the opening 28a. This space is formed between a front surface 18f of the opening and closing member 18 and the outer surface 82f provided on the rear side of the rear case 82. This space constitutes an article accommodation portion 28 capable of accommodating an article. Since the article accommodation portion 28 has the opening 28a, the article accommodation portion 28 can accommodate a part of the adapter device 50, which will be described below. In other words, the article accommodation portion 28 is always exposed to the outside via the opening 28a.

As shown in FIG. 8, as for a thickness of the case main body portion 80 in the front-rear direction, a thickness W2 of a left side portion where the opening and closing member 18 is provided is smaller than a thickness W1 of a right side portion accommodating the interface adapter 4. As described above, in the case main body portion 80, since the portion where the opening and closing member 18 is provided is thin, it is easier to grip a left end part of the accommodation case 8 as compared with a configuration in which the thickness of this portion is the same as the thickness W1. In addition, an overall thickness of the accommodation case 8 can be reduced.

Further, in a case where the accommodation case 8 is placed on a placement surface 90 (see FIG. 8), such as a table, such that the display 7a faces upward, a gap between the accommodation case 8 and the placement surface 90 can be formed in the portion having a thin thickness where the opening and closing member 18 is provided. At this time, the projecting portion 17b provided on the rear surface 18a of the opening and closing member 18 comes into contact with the placement surface 90 so that the accommodation case 8 can be prevented from rattling in the front-rear direction while ensuring the above-described gap. In order to prevent this rattling, it is preferable that the height of the projecting portion 17b is about the same as a value obtained by subtracting the thickness W2 from the thickness W1. In a case of lifting the accommodation case 8 placed on the placement surface 90, the accommodation case 8 can be easily lifted by utilizing the above-described gap secured by the projecting portion 17b.

Figure 9:
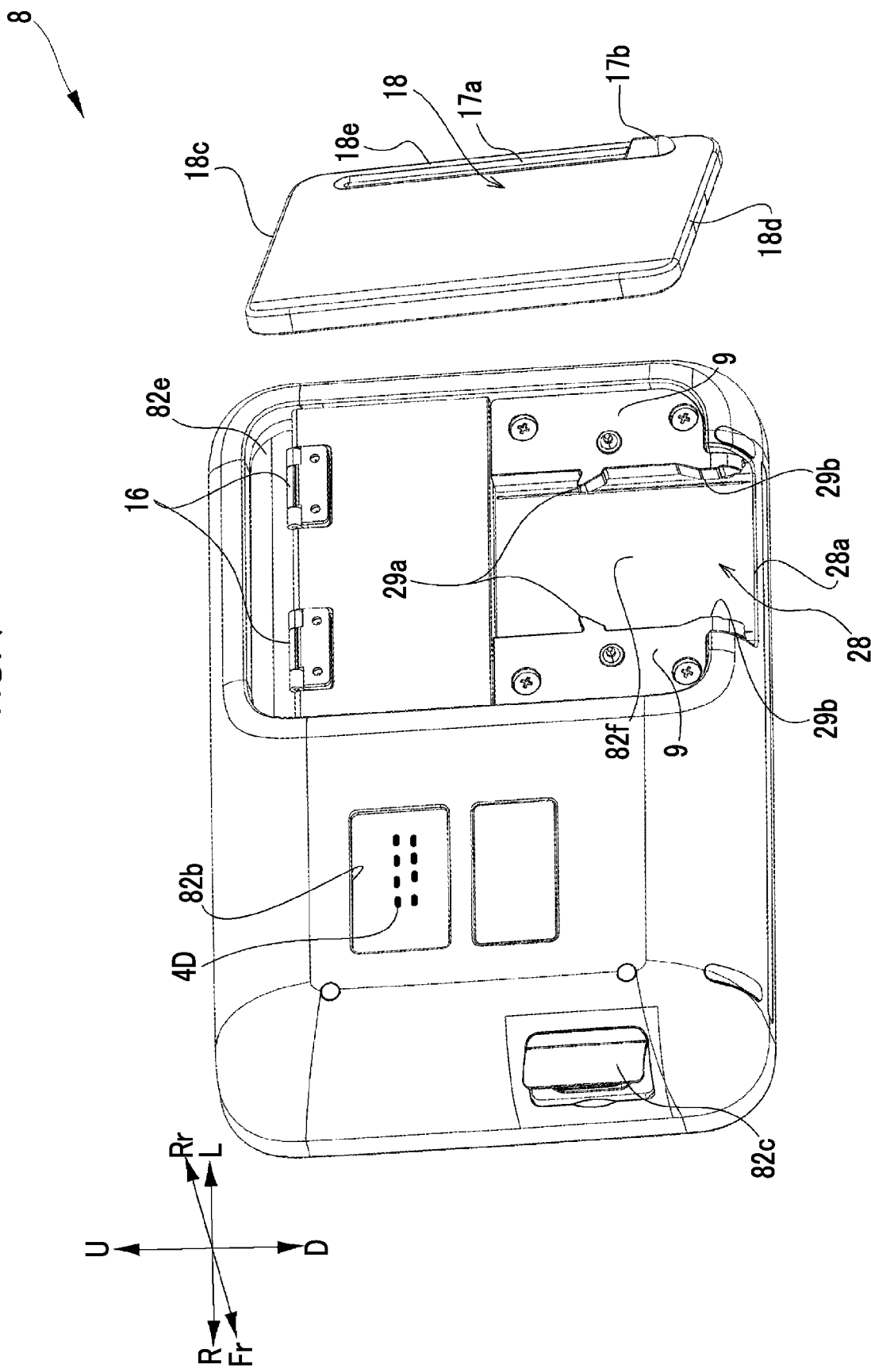
FIG. 9 is an exploded perspective view of the accommodation case 8 from which the opening and closing member 18 has been removed in order to show an internal structure of an article accommodation portion 28.

FIG. 9 is an exploded perspective view of the accommodation case 8 from which the opening and closing member 18 has been removed in order to show an internal structure of the article accommodation portion 28.

The article accommodation portion 28 is provided with a pair of engaging claws 29a, which are first engaging portions capable of engaging with other articles, and a pair of operating protruding portions 29b on both left and right sides of the article accommodation portion 28. The pair of engaging claws 29a are provided to protrude inward so as to face each other in the middle of the article accommodation portion 28 in the up-down direction, and each have an acute-angled distal end. The pair of operating protruding portions 29b are provided on a lower end side adjacent to the opening 28a so as to protrude lower than the engaging claws 29a in a trapezoidal shape. The engaging claw 29a and the operating protruding portion 29b are formed on, for example, one edge surface of each of a pair of metal engaging blocks 9. The engaging block 9 is fixed to the outer surface 82f of the rear case 82 by screwing or the like so as to define the article accommodation portion 28 together with the opening and closing member 18 and the rear case 82. The engaging claw 29a is a portion that engages with a second engaging portion 69b (see FIG. 17) of the adapter device 50, which will be described below.

Configuration of Adapter Device 50

The accommodation case 8 described so far can be attached to a body to be attached 200, such as a wall surface or a stand disposed on a floor surface, via the adapter device 50. Hereinafter, the configuration of the adapter device 50 will be described.

Figure 10:
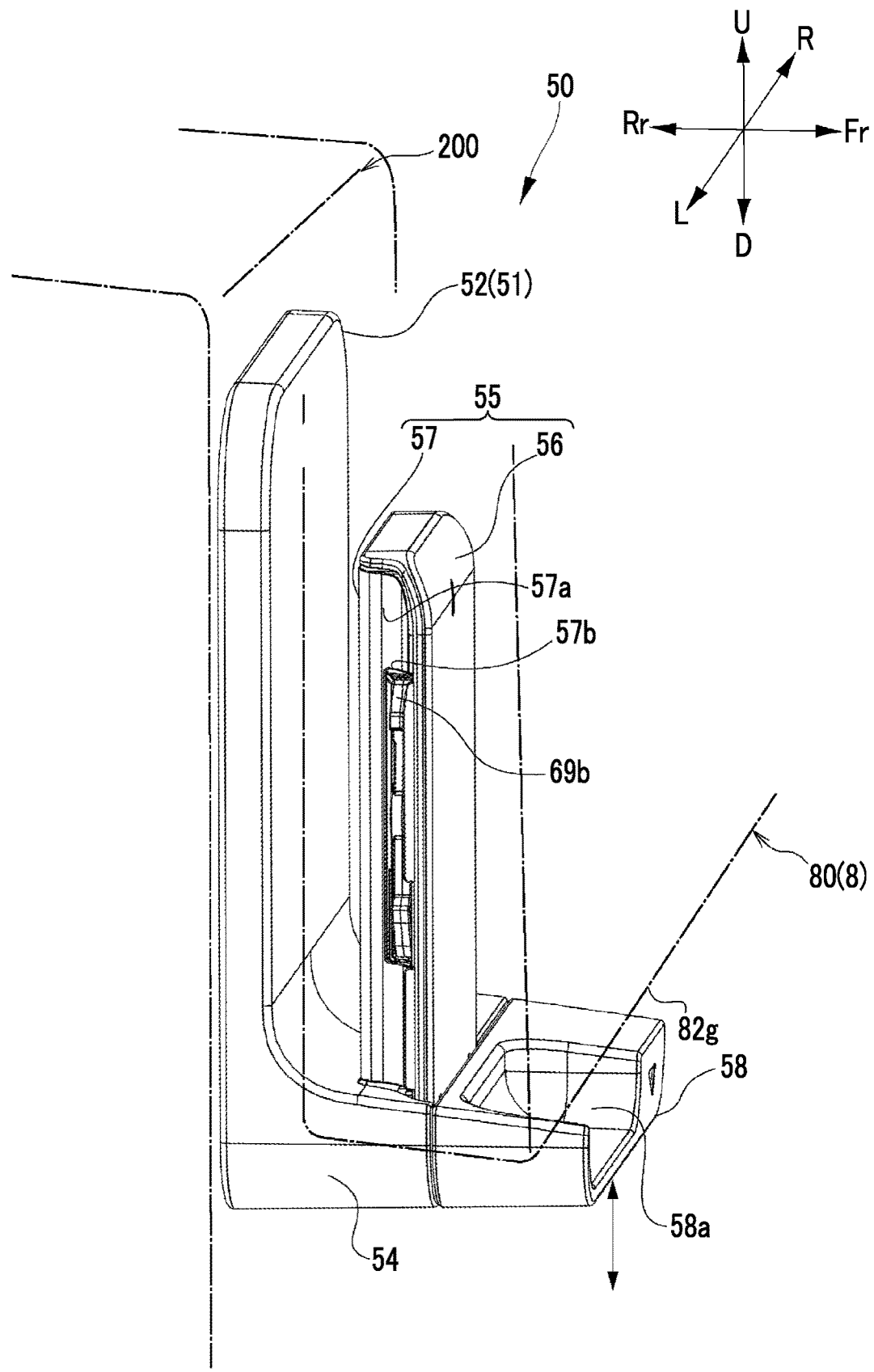
FIG. 10 is a perspective view of an adapter device 50 as viewed from ahead.
Figure 11:
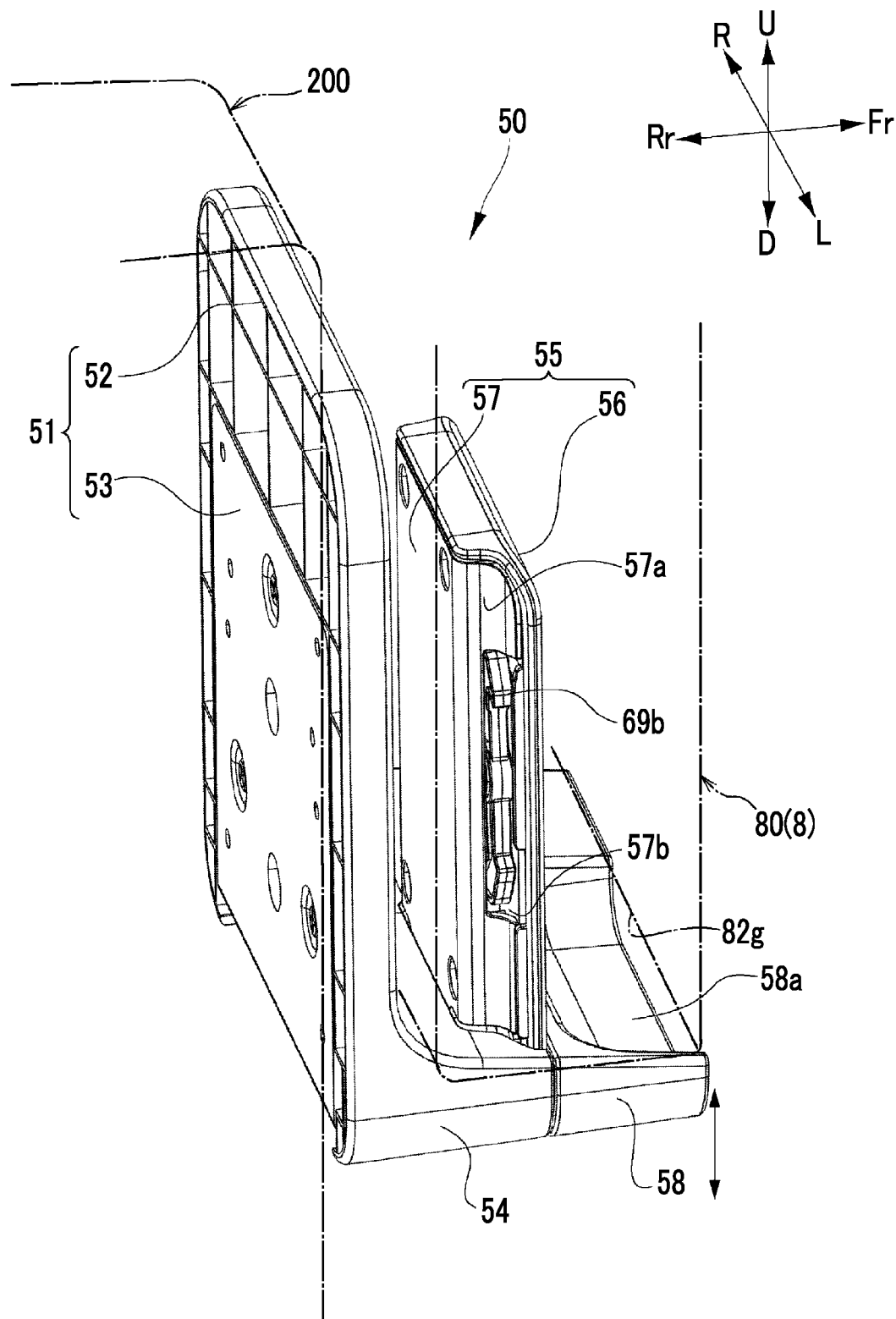
FIG. 11 is a perspective view of the adapter device 50 as viewed from behind.
Figure 12:
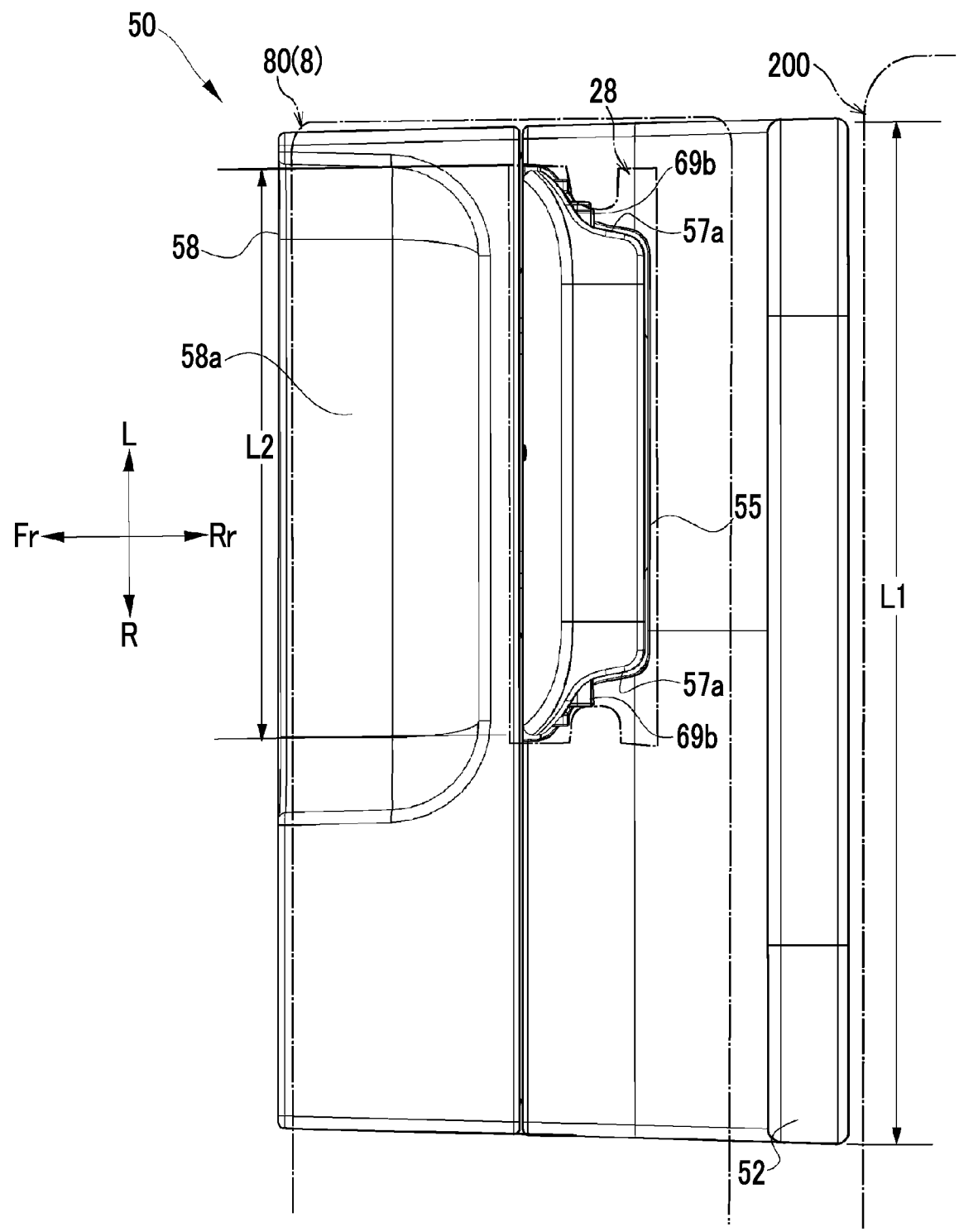
FIG. 12 is a plan view of the adapter device 50 as viewed from above.

FIG. 10 is a perspective view of the adapter device 50 as viewed from ahead. FIG. 11 is a perspective view of the adapter device 50 as viewed from behind. FIG. 12 is a plan view of the adapter device 50 as viewed from above.

As shown in FIGS. 10, 11, and 12, the adapter device 50 comprises a plate-shaped base portion 54 of which a thickness direction coincides with the up-down direction and a longitudinal direction coincides with the left-right direction, and an insertion portion 55 and a fixing portion 51 that are provided upright from an upper surface of the base portion 54 toward the upper side. The insertion portion 55 has a plate shape of which a thickness direction coincides with the front-rear direction and a longitudinal direction coincides with the up-down direction. The fixing portion 51 has a plate shape of which a thickness direction coincides with the front-rear direction and a longitudinal direction coincides with the up-down direction, and is located behind the insertion portion 55.

The insertion portion 55 is configured to have a shape such that it is capable of being inserted into the article accommodation portion 28 of the case main body portion 80. Further, the fixing portion 51 is a portion capable of being fixed to the body to be attached 200. That is, the adapter device 50 is an attachment intervening means for connecting the above-mentioned accommodation case 8 as an attachment body and the body to be attached 200 to each other. The body to be attached 200 includes an attachment portion of a stand or a wall surface installed at a high place, and a mount for fixing the attachment portion and the adapter device 50. As this mount, for example, a mount conforming to a Video Electronics Standards Association (VESA) standard is used.

In top view, the insertion portion 55 has a curved shape such that a contour shape of left and right side surfaces 57a narrows in width from the front side to the rear side and is slightly recessed inward in the left-right direction, as shown in FIG. 12. The second engaging portions 69b are partially exposed to the left and right from side surface openings 57b (see FIGS. 10 and 11) formed in the left and right side surfaces 57a.

As shown in FIG. 11, the fixing portion 51 comprises a back surface member 52 parallel to the insertion portion 55 and provided at a position facing the rear surface of the case main body portion 80 with the insertion portion 55 interposed therebetween in a state in which the insertion portion 55 is accommodated in the article accommodation portion 28 of the accommodation case 8, and an attachment plate 53 fixed to a rear surface of the back surface member 52 and conforming to the VESA standard.

The back surface member 52 extends further upward than the insertion portion 55. As shown in FIG. 12, a length L1 of the back surface member 52 in the left-right direction is configured to be larger than a length L2 of the insertion portion 55 in the left-right direction. Further, the insertion portion 55 is eccentrically disposed on one side (the left side in the present embodiment) in the left-right direction with respect to the center of the back surface member 52 in the left-right direction.

As shown in FIG. 10, an operation portion 58 is provided on a front side of the base portion 54. The operation portion 58 is provided at a position facing a lower-side surface 82g of the case main body portion 80 in a state in which the insertion portion 55 is inserted into the article accommodation portion 28, that is, in a state in which the accommodation case 8 is held by the adapter device 50. As will be described below, the operation portion 58 is movable in a direction (downward) opposite to a protruding direction of the insertion portion 55. Further, the operation portion 58 is provided with a recessed portion 58a so as to be spaced apart from the lower-side surface 82g of the case main body portion 80, thereby improving operability in the operation of attaching and detaching the accommodation case 8 with respect to the adapter device 50.

Figure 13:
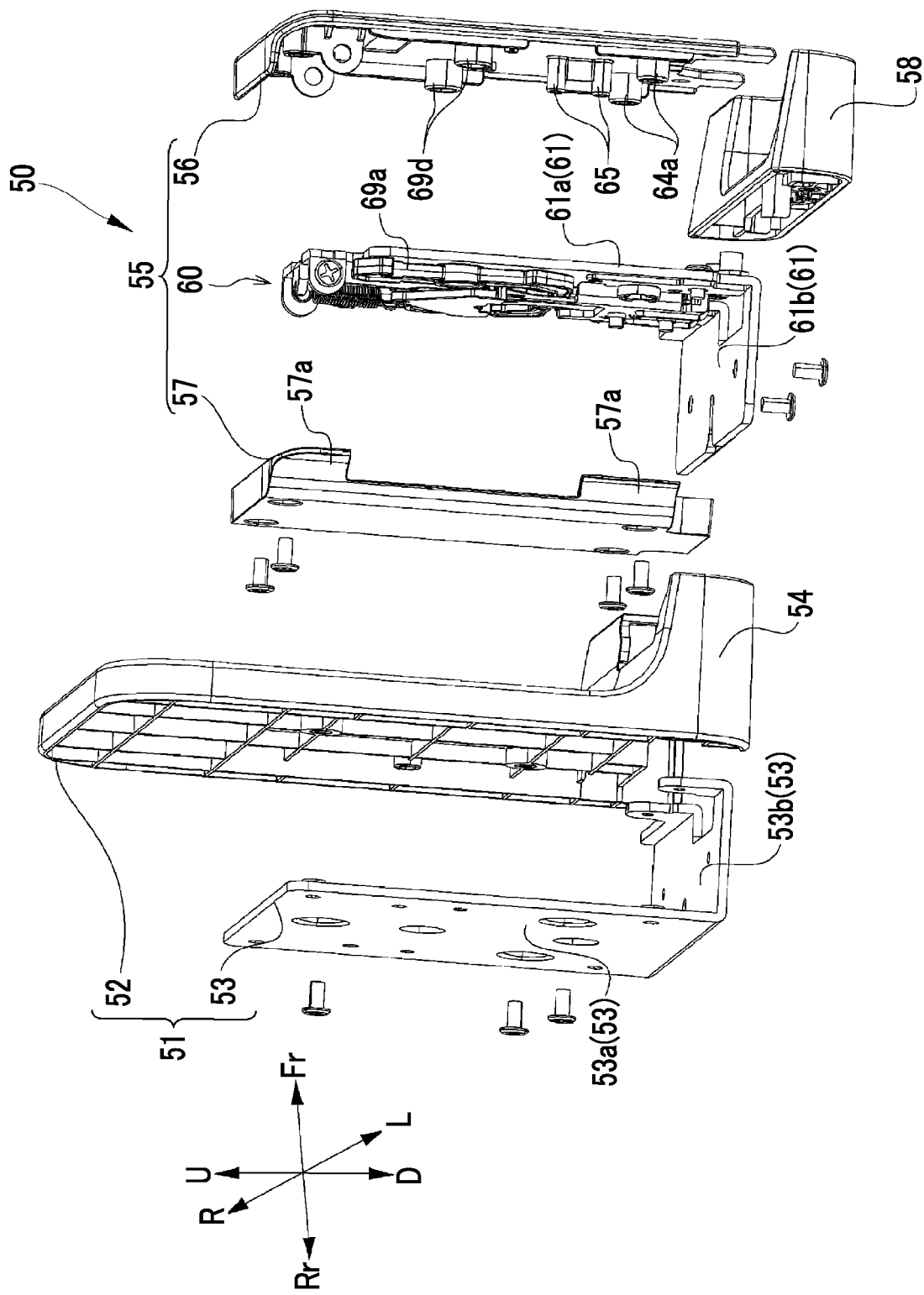
FIG. 13 is an exploded perspective view of the adapter device 50.

FIG. 13 is an exploded perspective view of the adapter device 50.

As shown in FIG. 13, in the fixing portion 51, the metal attachment plate 53 having a substantially L-like shape in side view (as viewed from the left-right direction) is fixed to a rear side of the back surface member 52 by a screw or the like. The attachment plate 53 comprises a plate-shaped vertical portion 53a of which a thickness direction coincides with the front-rear direction and which extends in the up-down direction, and a plate-shaped horizontal portion 53b perpendicular to the vertical portion 53a. The vertical portion 53a is fixed to the back surface member 52, and the horizontal portion 53b passes through the inside of the base portion 54 and extends forward.

The insertion portion 55 comprises a front cover 56, a rear cover 57, and a locking mechanism 60 provided between the front cover 56 and the rear cover 57. The locking mechanism 60 has, for example, a metal insertion portion plate 61 having a substantially L-like shape in side view, and various driving members, which will be described below, are disposed on a vertical portion 61a of the insertion portion plate 61. A horizontal portion 61b of the insertion portion plate 61 and the horizontal portion 53b of the attachment plate 53 are connected to each other by a screw or the like. With this, a strong metal skeleton portion of the adapter device 50 is formed. The operation portion 58 is attached to a member, which will be described below, that moves up and down on the vertical portion 61a.

Configuration of Locking Mechanism 60

Figure 14:
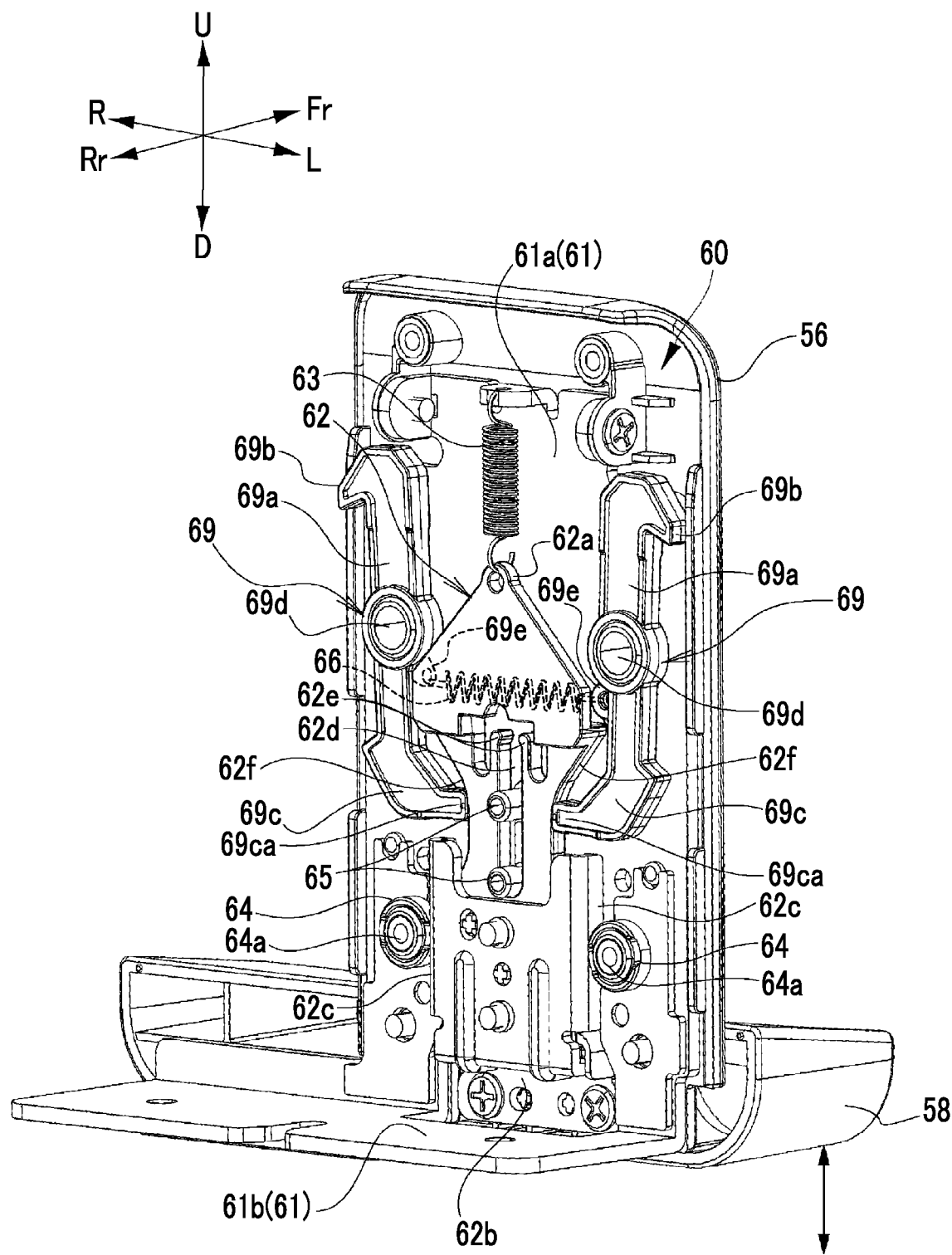
FIG. 14 is a perspective view showing a configuration of a locking mechanism 60.

FIG. 14 is a perspective view showing the configuration of the locking mechanism 60.

Each component of the locking mechanism 60 is disposed along a rear surface of the vertical portion 61a of the insertion portion plate 61. The vertical portion 61a is provided with a pair of rotating members 69 and a slide plate 62 that is slidable in the up-down direction.

The rotating members 69 are provided on both left and right end sides of the insertion portion plate 61. The rotating member 69 has the second engaging portion 69b provided on one end side (the upper side) of an arm 69a extending along the vertical portion 61a, and an interlocking portion 69c provided on the other end side (the lower side). A central portion of the arm 69a is rotatably supported by an arm support shaft 69d (see FIG. 13), which is provided on a rear surface of the front cover 56 in a protruding manner. With this, the rotating member 69 can swing along the rear surface of the vertical portion 61a.

A spring attachment portion 69e is provided on a lower end side of the arm 69a with respect to the arm support shaft 69d. A horizontal spring 66 is attached to the spring attachment portion 69e. With this, the rotating members 69 are biased such that distal ends 69ca of the interlocking portions 69c come into contact with operating inclined surfaces 62f formed on both edge surfaces on the left and right of the slide plate 62. The horizontal spring 66 is disposed on the front side with respect to the slide plate 62.

The slide plate 62 is provided between the pair of rotating members 69 along the vertical portion 61a. A vertical spring 63 is attached to an upper end part 62a of the slide plate 62, and the slide plate 62 is biased upward. An operation portion fixing portion 62b fixed to the operation portion 58 is provided at a lower end part of the slide plate 62.

The slide plate 62 is biased upward in a state in which the operation portion 58 is not operated, and the slide plate 62 is moved downward by an operation of pressing the operation portion 58 downward. Further, in the support structure of the slide plate 62, for example, left and right side edge surfaces 62c provided on a lower end side thereof are guided by guide rollers 64. The guide rollers 64 are pivotally supported, for example, by a pair of support shafts 64a (see FIG. 13), which are provided on an inner side of the front cover 56 in a protruding manner. Furthermore, the slide plate 62 has an elongated hole 62d formed in a central portion in the left-right direction along the up-down direction. A pair of upper and lower guide pins 65 (see FIG. 13) are inserted through the elongated hole 62d, and the movement of the slide plate 62 is guided by the guide pins 65. A pair of left and right elastic protruding pieces 62e capable of elastically engaging with the guide pin 65 when the slide plate 62 moves downward are provided on an upper end side of the elongated hole 62d.

Operation of Locking Mechanism 60

Hereinafter, the operation of the locking mechanism 60 in a case where the accommodation case 8 is attached to and detached from the adapter device 50 will be described with reference to FIGS. 15 to 20.

Figure 15:
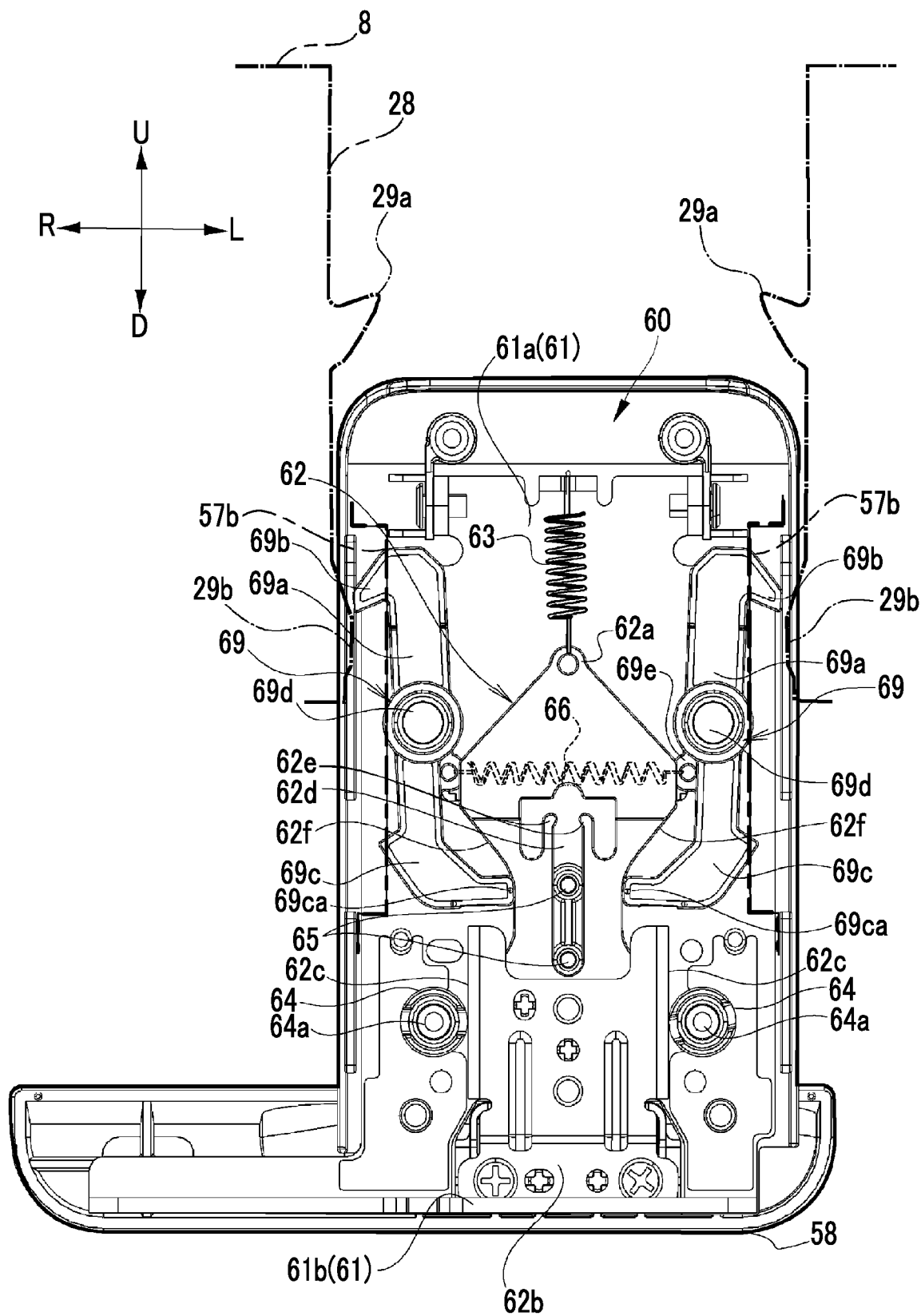
FIG. 15 is a schematic view showing a state of the locking mechanism 60 before the accommodation case 8 is mounted on the adapter device 50.

FIG. 15 is a schematic view showing a state of the locking mechanism 60 before the accommodation case 8 is mounted on the adapter device 50.

In the state of the locking mechanism 60 before the accommodation case 8 is mounted on the adapter device 50, the slide plate 62 is pulled up by the vertical spring 63, as shown in FIG. 15. At this time, in the rotating member 69, the distal end 69ca of the interlocking portion 69c is in contact with the operating inclined surface 62f With this, the second engaging portions 69b protrude from the side surface openings 57b to left and right outer sides of the left and right side surfaces 57a and, in this state, can engage with the engaging claws 29a of the accommodation case 8. However, in this state, the interlocking portions 69c do not substantially protrude from the left and right side surfaces 57a of the insertion portion 55. That is, the interlocking portion 69c cannot come into contact with the accommodation case 8 when the second engaging portion 69b is in a first position where the second engaging portion 69b can engage with the engaging claw 29a.

Figure 16:
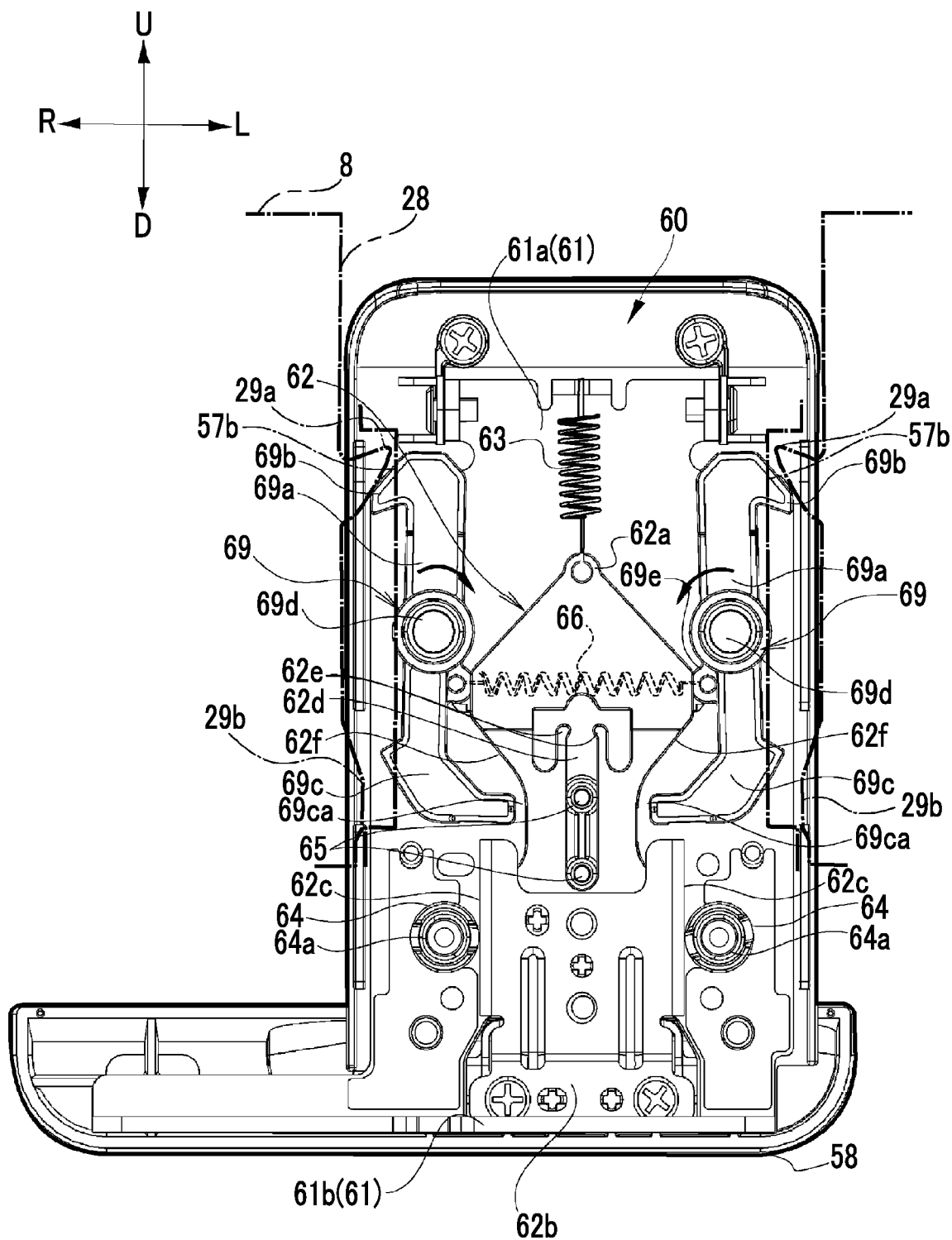
FIG. 16 is a schematic view showing an initial state of the locking mechanism 60 in which mounting of the accommodation case 8 on the adapter device 50 is started.

FIG. 16 is a schematic view showing an initial state of the locking mechanism 60 in which mounting of the accommodation case 8 on the adapter device 50 is started.

In a case where the accommodation case 8 is mounted on the insertion portion 55, as shown in FIG. 16, the insertion portion 55 enters the article accommodation portion 28, and a distal end of the second engaging portion 69b of the adapter device 50 comes into contact with the engaging claw 29a of the accommodation case 8. With this, the pair of rotating members 69 swing so that upper end sides of the pair of rotating members 69 are pushed by inclined surfaces of the engaging claws 29a and move to a left-right center side of the insertion portion 55. As a result, the engaging claw 29a is allowed to move to the lower side of the second engaging portion 69b.

Figure 17:
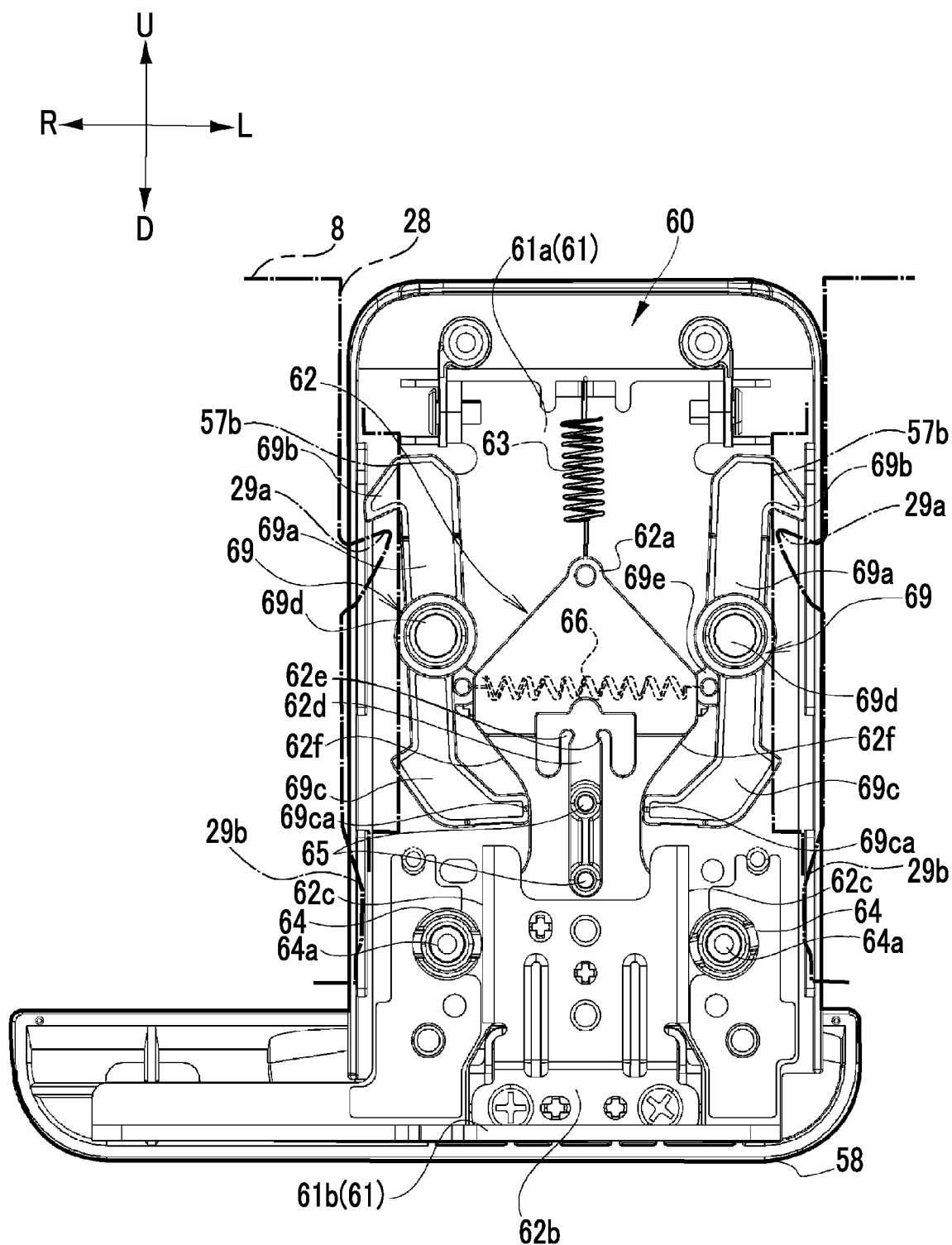
FIG. 17 is a schematic view showing a state of the locking mechanism 60 when the mounting of the accommodation case 8 on the adapter device 50 is completed.

FIG. 17 is a schematic view showing a state of the locking mechanism 60 when the mounting of the accommodation case 8 on the adapter device 50 is completed.

As shown in FIG. 17, the engaging claw 29a has entered below the second engaging portion 69b in a state in which the mounting of the accommodation case 8 is completed. At this time, the pair of rotating members 69 swing such that both upper end sides are opened to the left and right by a biasing force of the horizontal spring 66. With this, the engaging claw 29a is located below the second engaging portion 69b. As a result, the engaging claw 29a is positionally restricted so as not to fall off upward because of a catching shape of the second engaging portion 69b in the upward movement. In the state shown in FIG. 17, the operating protruding portion 29b of the accommodation case 8 is located below the interlocking portion 69c.

Figure 18:
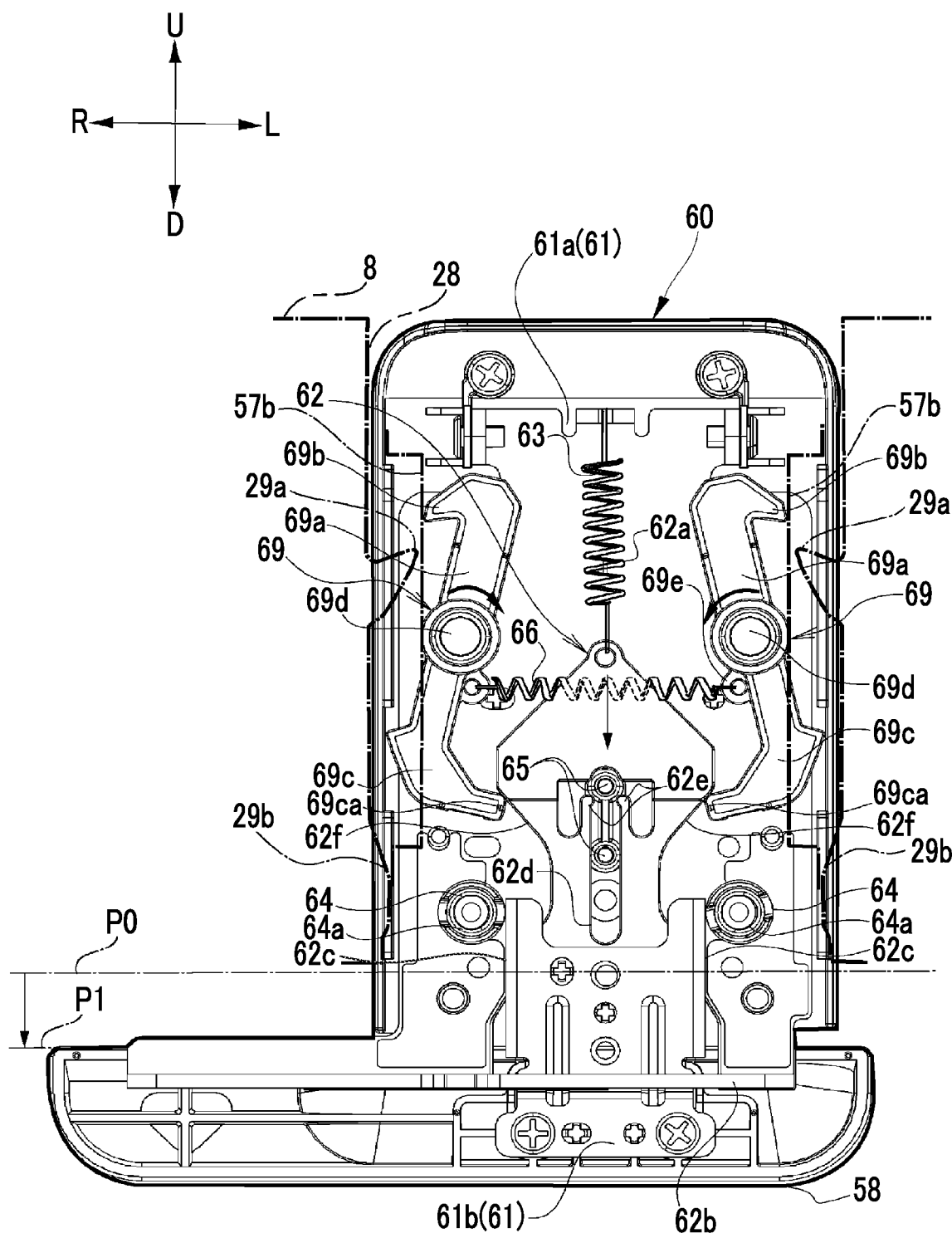
FIG. 18 is a schematic view showing an unlocked state of the locking mechanism 60 when an operation portion 58 is operated.

FIG. 18 is a schematic view showing an unlocked state of the locking mechanism 60 when the operation portion 58 is operated.

In a case where the accommodation case 8 is removed from the adapter device 50, the operation portion 58 is moved in a direction away from the lower-side surface 82g of the case main body portion 80, that is, from an initial position P0 to a lower position P1, as shown in FIG. 18. As a result, the second engaging portion 69b can be moved from the first position where the second engaging portion 69b can engage with the engaging claw 29a to a second position where the second engaging portion 69b cannot engage with the engaging claw 29a.

This operation will be described in more detail.

First, the slide plate 62 is moved downward by the downward movement of the operation portion 58. With this operation, the operating inclined surfaces 62f push the left and right interlocking portions 69c in directions in which the left and right interlocking portions 69c are opened left and right outward. As a result, the second engaging portion 69b moves to the second position (a position retracted inward from the side surface opening 57b) where the second engaging portion 69b cannot engage with the engaging claw 29a. The state in which the second engaging portion 69b is retracted inward from the side surface opening 57b is temporarily maintained by a configuration, which will be described below. Therefore, the accommodation case 8 is pulled upward by the operation of the operation portion 58, whereby the accommodation case 8 can be pulled out from the insertion portion 55.

Here, the reason why the position of the operation portion 58 is held (locked) in a state of being moved downward is due to the engagement between the guide pin 65 and the elastic protruding pieces 62e. In this engagement, as shown in FIG. 18, the upper guide pin of the pair of guide pins 65 is caught on the distal ends of the elastic protruding pieces 62e by the downward movement of the operation portion 58. With this, the slide plate 62 is locked against a force pulling the vertical spring 63 upward. In this state, the accommodation case 8 is moved upward, whereby the engaging claw 29a can be moved upward of the second engaging portion 69b without being caught on the second engaging portion 69b.

Figure 19:
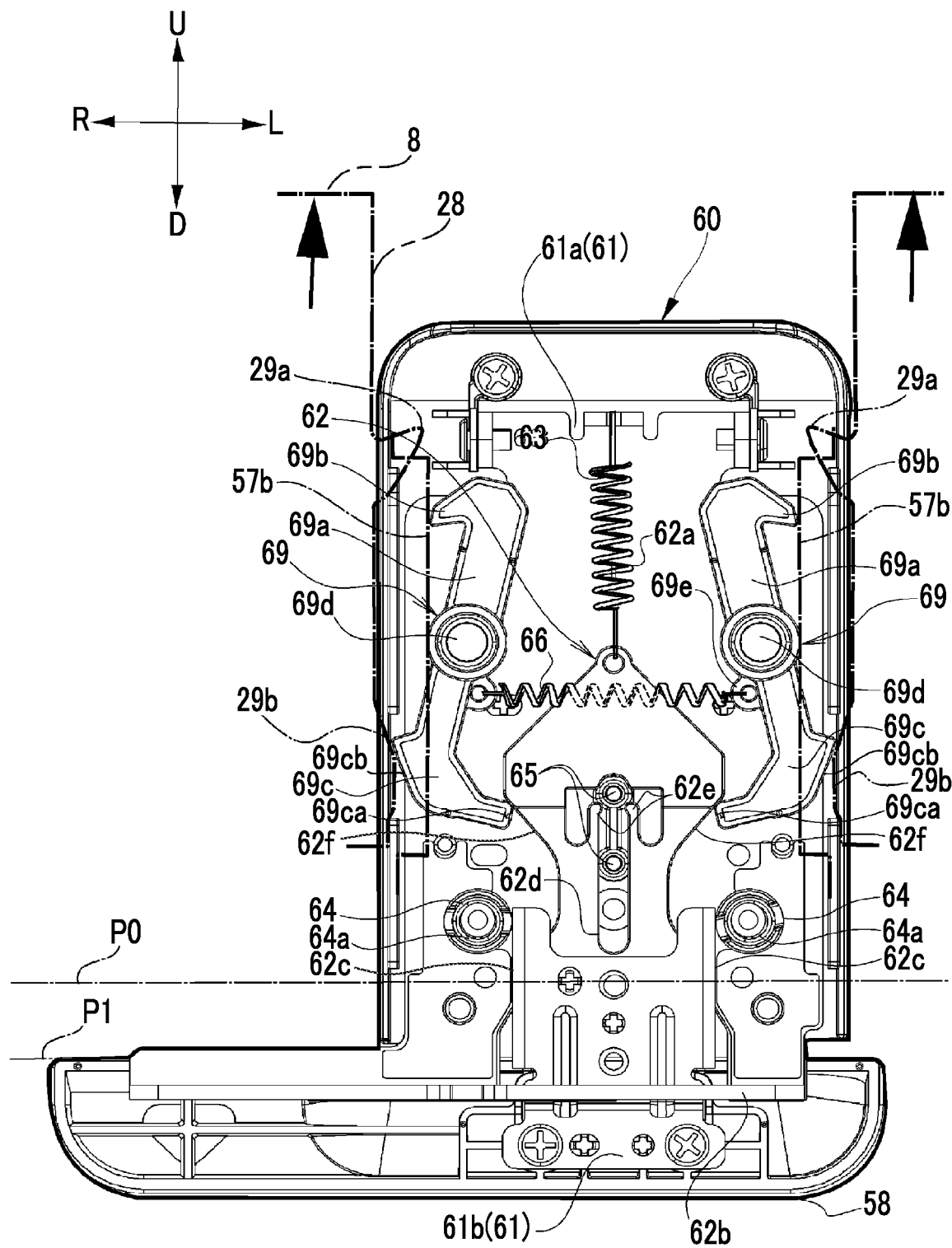
FIG. 19 is a schematic view showing a state of the locking mechanism 60 immediately before the operation portion 58 is unlocked.

FIG. 19 is a schematic view showing a state of the locking mechanism 60 immediately before the operation portion 58 is unlocked.

As shown in FIG. 19, a removal operation is performed by moving the accommodation case 8 such that the accommodation case 8 is pulled out upward from the state shown in FIG. 18. At this time, the operating protruding portion 29b of the accommodation case 8, which has been located below the interlocking portion 69c, comes into contact with an inclined surface 69cb provided on a lower end side of the interlocking portion 69c from below. The distal end 69ca of the interlocking portion 69c pushes the operating inclined surface 62f of the slide plate 62 through this contact. In this way, the slide plate 62 is pinched in the left-right direction between the distal ends 69ca of the interlocking portions 69c.

Figure 20:
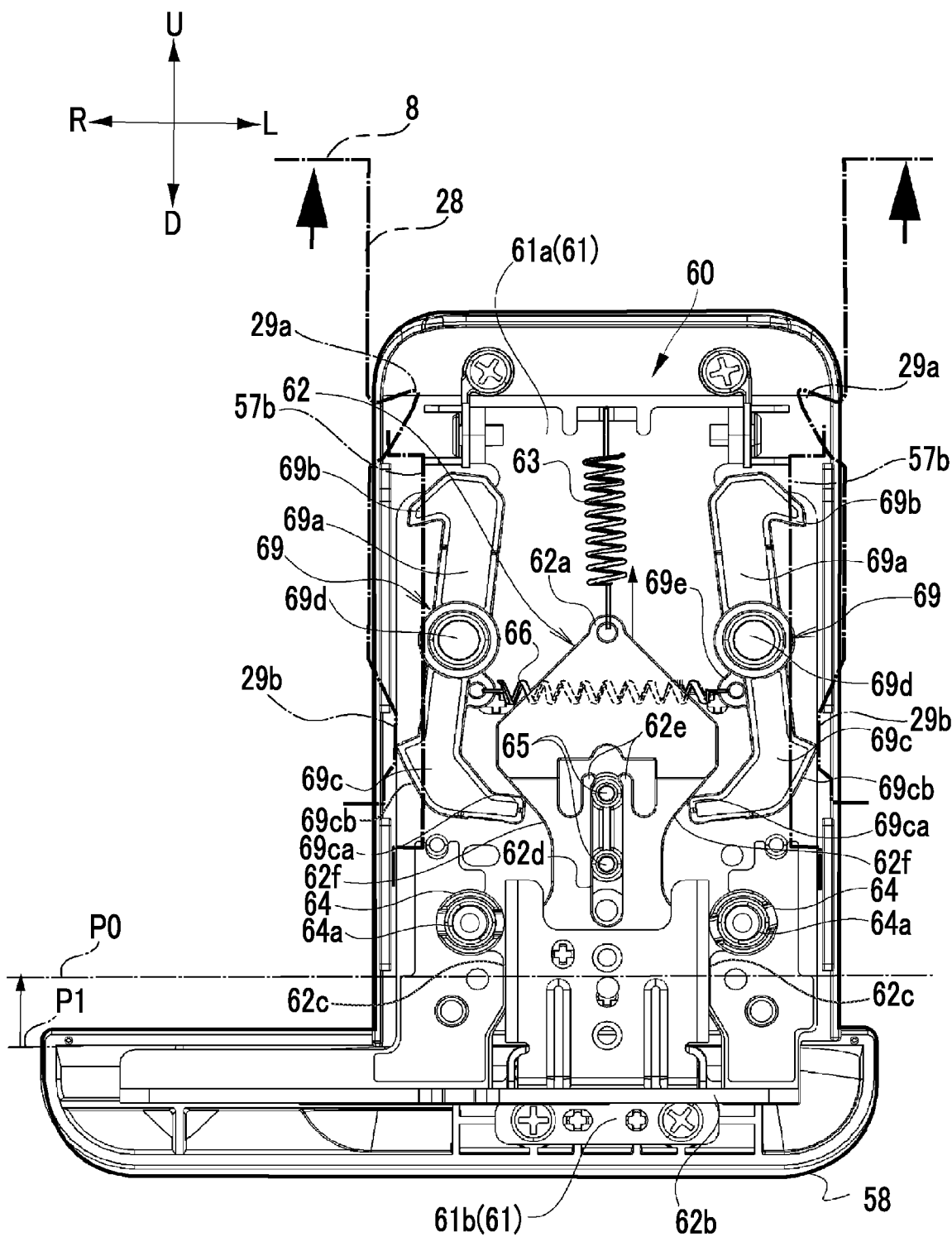
FIG. 20 is a schematic view showing a state of the locking mechanism 60 when the operation portion 58 is unlocked.

FIG. 20 is a schematic view showing a state of the locking mechanism 60 when the operation portion 58 is unlocked.

An upward force (a component force) is applied to the operating inclined surface 62f by the operation of the interlocking portion 69c, and the slide plate 62 is pushed upward to disengage the elastic protruding pieces 62e, as shown in FIG. 20. At this time, the operation portion 58 interlocks with the slide plate 62, moves upward together with the slide plate 62, and returns to an original position (the initial position P0).

As described above, the slide plate 62 and the operation portion 58 return to the initial position P0 through the unlocking, but the operation time of the rotating member 69 does not interlock with the return operations of the slide plate 62 and of the operation portion 58. This is because the shape of the operating protruding portion 29b is trapezoidal, and the contact state between the operating protruding portions 29b and the interlocking portions 69c (left and right outer ends of the interlocking portions 69c) is maintained for a predetermined distance during the movement of the pulling operation, as shown in FIG. 20. With this, the operation time is delayed such that the rotating member 69 does not immediately return to the original position (the position where the second engaging portion 69b can engage with the engaging claw 29a), even in a case where the unlocking is performed. As a result, the second engaging portion 69b returns to the original position after the engaging claw 29a moves to a position where the second engaging portion 69b is not caught on the engaging claw 29a.

In this way, the operating protruding portion 29b provided on a case main body portion 80 side comes into contact with the interlocking portion 69c located in a position where the interlocking portion 69c can come into contact with the accommodation case 8 so that the second engaging portion 69b returns from the second position where the second engaging portion 69b cannot engage with the accommodation case 8 to the first position where the second engaging portion 69b can engage with the accommodation case 8. That is, in the locking mechanism 60, the slide plate 62 is unlocked by the movement operation of removing the accommodation case 8 from the adapter device 50, and the accommodation case 8 returns to a mountable state (the state shown in FIG. 15) again.

As described above, with the accommodation case 8, the distal end of the opening and closing member 18 and a lower surface of the case main body portion 80 are brought into contact with the placement surface 90 in a state in which the opening and closing member 18 is opened, whereby the accommodation case 8 can be placed on the placement surface 90 in a state of being held at a desired angle. Therefore, the operability of the accommodated portable information terminal 7 can be improved.

In addition, with the accommodation case 8, the article can be accommodated in the article accommodation portion 28 via the opening 28a in a state in which the opening and closing member 18 is closed. As described above, the article accommodation portion 28 and the insertion portion 55 of the adapter device 50 are formed in corresponding shapes, so that it is possible to mount the accommodation case 8 on the adapter device 50 without providing a dedicated attachment portion only for attaching the adapter device 50 to the accommodation case 8. As a result, the size and the manufacturing cost of the accommodation case 8 can be reduced.

The article accommodation portion 28 can also accommodate articles other than the insertion portion 55. For example, the communication cable 13 shown in FIG. 1 can be accommodated in the article accommodation portion 28 in a state in which the endoscope 1 is not used. In addition to this, it is also possible to accommodate a treatment tool, a charging cable of the portable information terminal 7, or the like in the article accommodation portion 28. In addition, an expansion unit, such as a wireless adapter or a spare battery, may be mounted such that the expansion unit attachably and detachably engages with the engaging claw 29a. In particular, since the opening and closing angle of the opening and closing member 18 is changeable in a continuously variable manner, it is possible to accommodate articles having various thicknesses by adjusting the opening and closing angle of the opening and closing member 18 according to the thickness of the article to be accommodated in the article accommodation portion 28. In this way, the articles other than the adapter device 50 can be accommodated in the article accommodation portion 28, so that it is possible to easily store and transport equipment necessary for the endoscope system 100.

With the adapter device 50 described above, since the insertion portion 55 capable of being inserted into the article accommodation portion 28 from the opening 28a of the accommodation case 8 and the fixing portion 51 capable of being fixed to the body to be attached 200 are provided, the accommodation case 8 can be easily fixed to the body to be attached 200 via the adapter device 50. For example, in a case where a VESA standard mount is attached to the body to be attached 200, it is possible to attach the accommodation case 8 to the body to be attached 200 via the mount only through a procedure of fixing the fixing portion 51 of the adapter device 50 to the mount and of inserting the insertion portion 55 of the adapter device 50 into the article accommodation portion 28 of the accommodation case 8.

Further, with the adapter device 50, since the second engaging portion 69b capable of engaging with the engaging claw 29a provided in the accommodation case 8 is provided, the engagement between the engaging claw 29a and the second engaging portion 69b can prevent the accommodation case 8 from falling off from the adapter device 50.

Further, with the adapter device 50, since the operation portion 58 that disengages the engaging claw 29a and the second engaging portion 69b from each other is provided, the adapter device 50 and the accommodation case 8 can be easily disengaged from each other by the operation of the operation portion 58. As a result, it is easier to perform a procedure of switching between a case where the accommodation case 8 is used alone and a case where the accommodation case 8 is attached to the body to be attached 200 and used. In addition, since the operation portion 58 is provided at a position facing the lower-side surface 82g of the case main body portion 80 in a state in which the insertion portion 55 is inserted into the article accommodation portion 28, the operation portion 58 can be easily operated. As shown in FIG. 10, the presence of the recessed portion 58a makes it possible to easily operate the operation portion 58 by inserting a finger into the recessed portion 58a, even in a state in which the lower-side surface 82g and the operation portion 58 face each other.

Further, with the adapter device 50, the operation portion 58 is moved in a direction away from the lower-side surface 82g of the case main body portion 80, so that the second engaging portion 69b can be moved from the first position (the position where the second engaging portion 69b can engage with the accommodation case 8) to the second position (the position where the second engaging portion 69b cannot engage with the accommodation case 8). Then, the position of the operation portion 58 is held in a state in which the second engaging portion 69b is moved to the second position. That is, in a state in which the second engaging portion 69b is moved to the second position (that is, in a state in which the accommodation case 8 can be removed), a state in which a space between the lower-side surface 82g of the case main body portion 80 and the operation portion 58 is increased is maintained. The position of the operation portion 58 is held, so that the hand operating the operation portion 58 can be released from the operation portion 58, and the accommodation case 8 can be gripped and removed from the adapter device 50 with both hands. In addition, a user can recognize a state of the engaging portion (whether or not the engaging portion is locked) by observing the position of the operation portion 58 (whether the operation portion 58 is raised or lowered). Further, for example, the space is utilized so that it is possible to facilitate the procedure of removing the accommodation case 8 from the adapter device 50.

In addition, the adapter device 50 comprises the interlocking portion 69c capable of returning the position of the second engaging portion 69b and the position of the operation portion 58 to the initial positions by interlocking with the removal operation of the accommodation case 8. That is, with the adapter device 50, it is possible to return the second engaging portion 69b and the operation portion 58 to the original positions only by removing the accommodation case 8 from the adapter device 50 in a state in which the accommodation case 8 and the insertion portion 55 are disengaged from each other by the operation of the operation portion 58. As a result, a special operation for returning the position of the operation portion 58 to the original position is not required, and convenience can be improved.

Further, with the adapter device 50, the back surface member 52 can be used as an insertion guide when the accommodation case 8 is attached to the adapter device 50. Therefore, the mountability of the accommodation case 8 on the adapter device 50 can be enhanced.

Further, with the adapter device 50, the insertion portion 55 is eccentrically disposed on the left side with respect to the center of the back surface member 52 in the left-right direction. As a result, the hand gripping the accommodation case 8 and each member have a positional relationship in which the hand is not sandwiched between the members, and the accommodation case 8 can be safely attached and detached.

As described above, at least the following matters are described in the present specification. Constituent elements and the like corresponding to the above-described embodiment are shown in parentheses, but the present invention is not limited thereto.

(1)

An accommodation case (the accommodation case 8) for an electronic device, comprising:
  a case main body (the case main body portion 80) capable of accommodating an electronic device (the portable information terminal 7) including a display (the display 7a); and
  an opening and closing member (the opening and closing member 18) supported on the case main body so as to be openable and closable,
  in which an article accommodation portion (the article accommodation portion 28) that is capable of accommodating at least a part of an article and that has an opening (the opening 28a) is formed between the opening and closing member and an outer surface (the outer surface 82f) of the case main body in a state in which the opening and closing member is closed.

According to (1), since, in a state in which the opening and closing member is opened, the distal end of the opening and closing member and the case main body are brought into contact with the placement surface so that the accommodation case can be placed on the placement surface in a state of being held at a predetermined angle, it is possible to improve the operability of the accommodated electronic device. In addition, the article can be accommodated in the article accommodation portion via the opening in a state in which the opening and closing member is closed. Therefore, in a case of constructing a system including, for example, an electronic device, an accommodation case, and an article, it is possible to facilitate storage or transport by making the system compact when the system is not in use. In addition, in a case where the article is, for example, a part of the adapter device for connecting another member and the accommodation case, the accommodation case can be easily attached to the other member.

(2)

The accommodation case for an electronic device according to (1),
  in which the opening is formed on a distal end side (in the lower end part 18d) of the opening and closing member.

According to (2), the article accommodation portion having the opening can be easily realized.

(3)

The accommodation case for an electronic device according to (1) or (2),
  in which the case main body is capable of further accommodating an interface adapter (the interface adapter 4) that converts an image pickup signal from an endoscope (the endoscope 1) into image data capable of being displayed by the electronic device and that transmits the image data to the electronic device.

According to (3), the image picked up by the endoscope can be displayed on the electronic device.

(4)

The accommodation case for an electronic device according to (3),
  in which the interface adapter is accommodated in a state of being eccentrically disposed on one side in the case main body, and
  the opening and closing member is supported at a position eccentric to the other side in the case main body.

A portion of the case main body that accommodates the interface adapter needs to be thick, but a portion on a side opposite to this portion can be made thin.

According to (4), since the opening and closing member can be disposed in a portion of the case main body where the thickness can be reduced, it is possible to improve portability by reducing the thickness of the accommodation case while forming an article accommodation space.

(5)

The accommodation case for an electronic device according to any one of (1) to (4),
  in which the opening and closing member has a projecting portion (the projecting portion 17b) or a recessed portion (the recessed portion 17a) that is formed in one end part (the left end part 18e) in a direction (the left-right direction) along an opening and closing shaft (the opening and closing shaft 16a) and in a surface (the rear surface 18a) on a side opposite to a case main body side and that extends along the one end part.

According to (5), one end side of the accommodation case is easily gripped by the projecting portion or by the recessed portion in a state in which the opening and closing member is closed. As a result, the portability can be improved.

(6)

The accommodation case for an electronic device according to any one of (1) to (5),
  in which, in the case main body, a thickness of a portion overlapping the opening and closing member is smaller than a thickness of the other portion.

According to (6), the portion overlapping the opening and closing member can be easily gripped by the hand, and the portability can be improved.

(7)

The accommodation case for an electronic device according to (6),
  in which the opening and closing member has a recessed portion (the recessed portion 17a) that is formed in one end part (the left end part 18e) in a direction (the left-right direction) along an opening and closing shaft (the opening and closing shaft 16a) and in a surface (the rear surface 18a) on a side opposite to a case main body side and that extends along the one end part, and further has a projecting portion (the projecting portion 17b) formed in the surface on the side opposite to the case main body side.

According to (7), the projecting portion is formed in a portion having a small thickness in the case main body, so that the case main body can be prevented from being tilted by the above-described projecting portion in the portion having a small thickness in the case main body in a case where the case main body is placed on the placement surface such that the opening and closing member faces the placement surface.

(8)

The accommodation case for an electronic device according to any one of (1) to (7),
  in which an engaging portion (the engaging claw 29a) capable of engaging with the article (the insertion portion 55) that is capable of being accommodated in the article accommodation portion is provided between the opening and closing member and the case main body.

According to (8), it is possible to prevent the article accommodated in the article accommodation portion from being separated from the case main body.

(9)

The accommodation case for an electronic device according to (8),
  in which the article is an adapter device (the adapter device 50) for attaching the accommodation case to another member (the body to be attached 200).

According to (9), a part of the adapter device is accommodated in the article accommodation portion, so that the accommodation case can be attached to the other member via the adapter device. As a result, the accommodation case can be held not only at the placement surface but also at a high position away from the placement surface, and the operability of the electronic device can be improved.

(10)

The accommodation case for an electronic device according to any one of (1) to (9),
  in which an opening and closing angle of the opening and closing member is changeable in a continuously variable manner.

According to (10), the operability of the accommodated electronic device can be improved. In addition, the opening and closing angle of the opening and closing member is adjusted according to the thickness of the article to be accommodated in the article accommodation portion, so that articles having various thicknesses can be accommodated.

(11)

The accommodation case for an electronic device according to any one of (1) to (10),
  in which the case main body has a window portion (the window portion 82b) through which information (the information of the nameplate 4D) added to a member accommodated in an inside is visually recognizable.

According to (11), in a case where the interface adapter for connecting the endoscope and the electronic device is accommodated in the case main body, it is possible to check from the window portion a denotation, such as reference conformity, in the housing of the interface adapter.

EXPLANATION OF REFERENCES

1: endoscope
4D: nameplate
4a: video input terminal
4: interface adapter
7a: display
7: portable information terminal
8: accommodation case
9: engaging block
10A: soft portion
10B: bendable portion
10C: distal end portion
10: endoscope insertion part
11: endoscope operation part
13: communication cable
16b: first attachment portion
16c: second attachment portion
16: hinge portion
17a, 58a: recessed portion
17b: projecting portion
18a: rear surface
18c, 62a: upper end part
18d: lower end part
18e: left end part
18f: front surface
18: opening and closing member
28a: opening
28: article accommodation portion
29a: engaging claw
29b: operating protruding portion
50: adapter device
51: fixing portion
52: back surface member
53a, 61a: vertical portion
53b, 61b: horizontal portion
53: attachment plate
54: base portion
55: insertion portion
56: front cover
57a: left and right side surfaces
57b: side surface opening
57: rear cover
58: operation portion
60: locking mechanism
61: insertion portion plate
62b: operation portion fixing portion
62c: side edge surface
62d: elongated hole
62e: elastic protruding piece
62f: operating inclined surface
62: slide plate
63: vertical spring
64: guide roller
65: guide pin
66: horizontal spring
69ca: distal end
69cb: inclined surface
69a: arm
69b: second engaging portion
69c: interlocking portion
69d: arm support shaft
69e: spring attachment portion
69: rotating member
80: case main body portion
81a: opening portion
81: front cover
82a: cable insertion hole
82b: window portion
82c: cable insertion hole lid
82e: upper recessed portion
82f: outer surface
82g: lower-side surface
82: rear case
90: placement surface
100: endoscope system
200: body to be attached
P0: initial position
P1: lower position

What is claimed is:

1. An accommodation case for an electronic device, comprising:
    a case main body capable of accommodating an electronic device including a display; and
    an opening and closing member supported on the case main body so as to be openable and closable,
    wherein an article accommodation portion is formed between a surface of the opening and closing member facing the case main body and an outer surface of the case main body in a state in which the opening and closing member is closed against the case main body,
    the article accommodation portion includes an opening capable of accommodating at least a part of an article in the state in which the opening and closing member is closed against the case main body,
    at least a part of the article is insertable into and removable from the article accommodation portion via the opening in the state in which the opening and closing member is closed against the case main body, and
    a position of the article accommodated in the article accommodation portion relative to the outer surface of the case main body does not change in association with opening and closing of the opening and closing member.

2. The accommodation case for an electronic device according to claim 1,
    wherein the opening is formed at a distal end side of the opening and closing member.

3. The accommodation case for an electronic device according to claim 1,
    wherein the case main body is capable of further accommodating an interface adapter that converts an image pickup signal from an endoscope into image data capable of being displayed by the electronic device and that transmits the image data to the electronic device.

4. The accommodation case for an electronic device according to claim 2,
    wherein the case main body is capable of further accommodating an interface adapter that converts an image pickup signal from an endoscope into image data capable of being displayed by the electronic device and that transmits the image data to the electronic device.

5. The accommodation case for an electronic device according to claim 3, wherein the interface adapter is accommodated in a state of being eccentrically disposed on one side in the case main body, and the opening and closing member is supported at a position eccentric to other side in the case main body.

6. The accommodation case for an electronic device according to claim 4, wherein the interface adapter is accommodated in a state of being eccentrically disposed on one side in the case main body, and the opening and closing member is supported at a position eccentric to other side in the case main body.

7. The accommodation case for an electronic device according to claim 1, wherein the opening and closing member has a projecting portion or a recessed portion that is formed at one end part in a direction along an opening and closing shaft of the opening and closing member and at a surface of the opening and closing member on a side opposite to a side at which the case main body is provided and that extends along the one end part.

8. The accommodation case for an electronic device according to claim 2, wherein the opening and closing member has a projecting portion or a recessed portion that is formed at one end part in a direction along an opening and closing shaft of the opening and closing member and at a surface of the opening and closing member on a side opposite to a side at which the case main body is provided and that extends along the one end part.

9. The accommodation case for an electronic device according to claim 1, wherein a thickness of a portion, of the case main body, overlapping the opening and closing member is smaller than a thickness of other portion of the case main body.

10. The accommodation case for an electronic device according to claim 2, wherein a thickness of a portion, of the case main body, overlapping the opening and closing member is smaller than a thickness of other portion of the case main body.

11. The accommodation case for an electronic device according to claim 9, wherein the opening and closing member has a recessed portion that is formed at one end part in a direction along an opening and closing shaft of the opening and closing member and at a surface of the opening and closing member on a side opposite to a side at which the case main body is provided and that extends along the one end part, and further has a projecting portion formed at the surface of the opening and closing member on the side opposite to the side at which the case main body is provided.

12. The accommodation case for an electronic device according to claim 10, wherein the opening and closing member has a recessed portion that is formed at one end part in a direction along an opening and closing shaft of the opening and closing member and at a surface of the opening and closing member on a side opposite to a side at which the case main body is provided and that extends along the one end part, and further has a projecting portion formed at the surface of the opening and closing member on the side opposite to the side at which the case main body is provided.

13. The accommodation case for an electronic device according to claim 1, wherein an engaging portion capable of engaging with the article that is capable of being accommodated in the article accommodation portion is provided between the opening and closing member and the case main body.

14. The accommodation case for an electronic device according to claim 2, wherein an engaging portion capable of engaging with the article that is capable of being accommodated in the article accommodation portion is provided between the opening and closing member and the case main body.

15. The accommodation case for an electronic device according to claim 13, wherein the article is an adapter device for attaching the accommodation case to another member.

16. The accommodation case for an electronic device according to claim 14, wherein the article is an adapter device for attaching the accommodation case to another member.

17. The accommodation case for an electronic device according to claim 1, wherein an opening and closing angle of the opening and closing member is changeable in a continuously variable manner.

18. The accommodation case for an electronic device according to claim 2, wherein an opening and closing angle of the opening and closing member is changeable in a continuously variable manner.

19. The accommodation case for an electronic device according to claim 1, wherein the case main body has a window portion through which information added to a member accommodated in an inside of the case main body is visually recognizable.

20. The accommodation case for an electronic device according to claim 2, wherein the case main body has a window portion through which information added to a member accommodated in an inside of the case main body is visually recognizable.

* * * * *